United States Patent
Yamamura et al.

(10) Patent No.: US 6,370,470 B1
(45) Date of Patent: Apr. 9, 2002

(54) ADAPTIVE CRUISE CONTROL SYSTEM FOR VEHICLE

(75) Inventors: Yoshinori Yamamura, Yokohama; Kouichi Akabori, Kanagawa, both of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/635,425

(22) Filed: Aug. 10, 2000

(30) Foreign Application Priority Data

Aug. 10, 1999 (JP) ............................ 11-226824

(51) Int. Cl.[7] .............................. B60K 31/00; B60T 7/12
(52) U.S. Cl. ......................... 701/96; 701/91; 340/903; 180/170
(58) Field of Search .................... 701/96, 301, 91, 701/93; 340/903, 435, 436; 367/99, 103; 180/197, 170, 179, 169

(56) References Cited

U.S. PATENT DOCUMENTS

| 5,215,159 A | * | 6/1993 | Nishida ..................... 180/179 |
| 5,752,214 A | * | 5/1998 | Minowa et al. ............. 701/111 |
| 5,781,103 A | * | 7/1998 | Gilling ....................... 340/441 |
| 6,009,368 A | * | 12/1999 | Labuhn et al. ................ 701/96 |
| 6,044,321 A | * | 3/2000 | Nakamura et al. ............ 701/96 |
| 6,076,622 A | * | 6/2000 | Charaborty et al. ......... 180/169 |
| 6,116,369 A | * | 9/2000 | King et al. .................. 180/169 |
| 6,175,799 B1 | * | 1/2001 | Tsutsumi et al. ............. 701/96 |
| 6,178,372 B1 | * | 1/2001 | Tabata et al. ................. 701/97 |

FOREIGN PATENT DOCUMENTS

| JP | 2000-25487 | 1/2000 |
| JP | 2000-219059 | 8/2000 |

* cited by examiner

Primary Examiner—Tan Nguyen
(74) Attorney, Agent, or Firm—Foley & Lardner

(57) ABSTRACT

An adaptive cruise control system for a host vehicle is arranged to calculate a target inter-vehicle distance between the preceding vehicle and the host vehicle, to calculate a target vehicle speed and a first target driving torque based on the inter-vehicle distance and the target inter-vehicle distance, to calculate a second target driving torque based on the target vehicle speed and the host vehicle speed, to generate a torque select signal based on the host vehicle speed, to select one of the first and second target driving torques based on the torque select signal, to match the selected target driving torque with a previous target driving torque when the target driving torque is changed, and to generate driving/braking force based on the selected target driving torque.

14 Claims, 12 Drawing Sheets

ADAPTIVE CRUISE CONTROL SYSTEM FOR VEHICLE

BACKGROUND OF THE INVENTION

The present invention relates to an adaptive cruise control (ACC) system for an automotive vehicle, and more particularly to an ACC system which controls a driving force and/or braking force of the vehicle so as to bring an inter-vehicle distance between a preceding vehicle and a host vehicle closer to a target inter-vehicle distance.

A typical ACC system is arranged to detect an inter-vehicle distance and to control a vehicle speed or driving/braking force so as to bring the inter vehicle distance closer to a target value. Such an ACC system employs one of an A-type method of employing a vehicle-speed sensor and generating a vehicle speed command and a B-type method of directly calculating the driving force command. The A-type method can provide an inter-vehicle distance control system where the affect of disturbance is eliminated by a robust design of a vehicle speed control system. However, this A-type method is required to further improve a control accuracy under an extremely low speed region. On the other hand, the B-type method can accurately perform the control under the low speed region, but it is required to simultaneously satisfy riding comfort and robustness against disturbances. The inventors of the present invention have proposed an ACC system which employs both of the A-type method adapted under a high-speed region and the B-type method adapted under a low-speed region.

SUMMARY OF THE INVENTION

However, this ACC system is further required to improve the responsibility of the ACC under a low-speed region against the increase of load to the system.

It is therefore an object of the present invention to provide an improved adaptive cruise control system which enables a controlled vehicle (host vehicle) to accurately execute a following control in the whole vehicle speed region including an extremely low speed region without adding an inter-vehicle distance control system for a low vehicle speed region.

An adaptive cruise control (ACC) system according to the present invention is installed to a host vehicle and comprises a vehicle speed detector detecting a vehicle speed of the host vehicle, a distance detector detecting an inter-vehicle distance between a preceding vehicle and the host vehicle, a driving/braking force generator generating driving/braking force according to a signal indicative of a target driving torque, and a controller connected to the vehicle speed detector, the distance detector and the driving/braking force generator. The controller calculates a target inter-vehicle distance between the preceding vehicle and the host vehicle, calculates a target vehicle speed and a first target driving torque based on the inter-vehicle distance and the target inter-vehicle distance, calculates a second target driving torque based on the host vehicle speed and the target vehicle speed, generates a torque select signal based on the host vehicle speed, selects one of the first and second target driving torques as the target driving torque based on the torque select signal, matches the selected target driving torque with a previous target driving torque when the target driving torque is changed, and outputs the control signal indicative of the target driving torque to said driving/braking force generator.

DETAILED DESCRIPTION OF THE INVENTION

Referring to FIGS. 1 to 10C, there is shown a first embodiment of an adaptive cruise control (ACC) system employed in a rear-wheel drive vehicle in accordance with the present invention. This ACC control system mainly executes a preceding-vehicle following control for following a preceding vehicle ahead of the rear-wheel drive vehicle (host vehicle).

Figure 1:
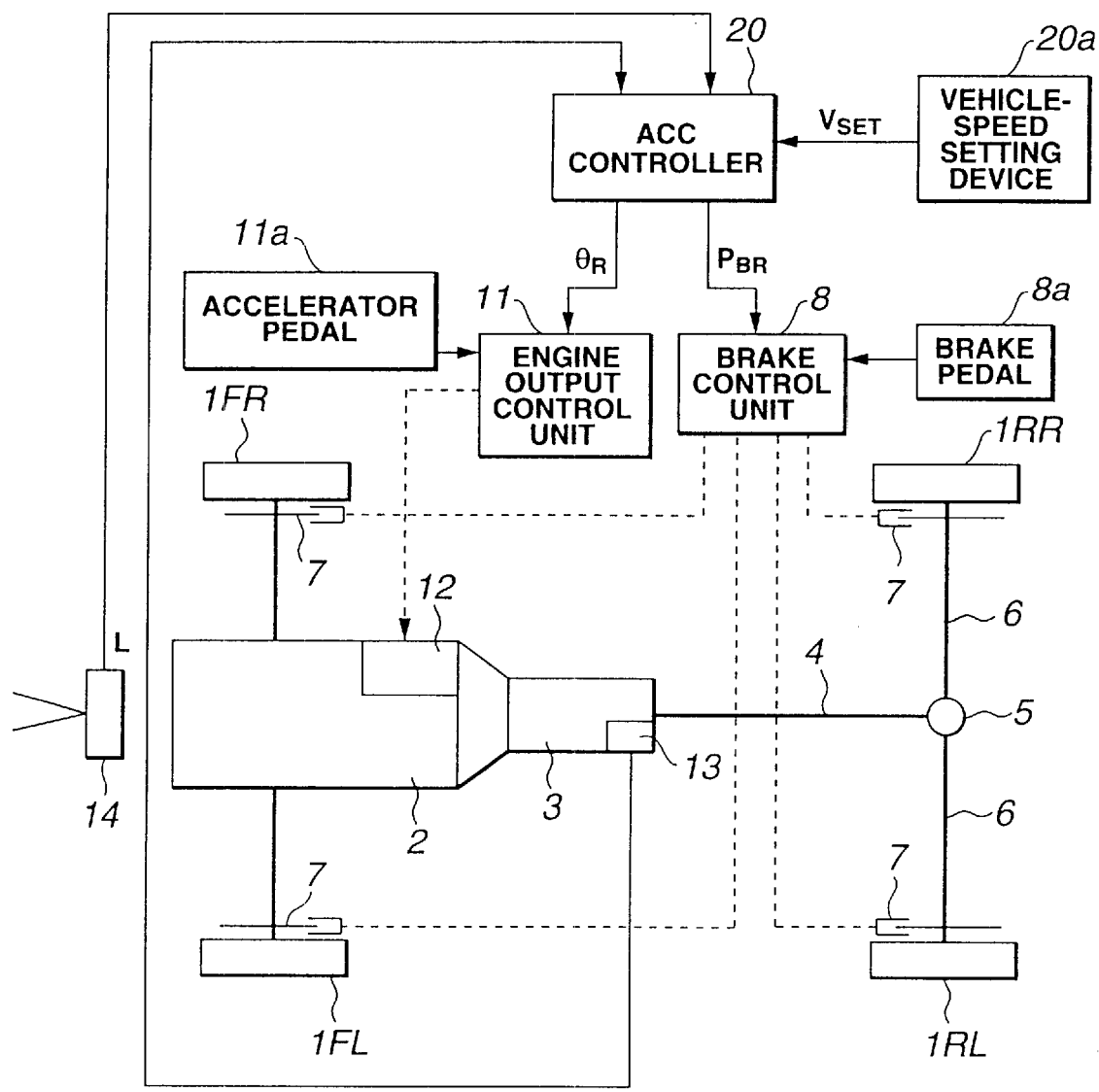
FIG. 1 is a schematic view showing a construction of a first embodiment according to the present invention.

As shown in FIG. 1, the host vehicle comprises front wheels 1FR and 1FL functioning as a driven wheel and rear wheels 1RR and 1RL functioning as a driving wheel. An internal combustion engine 2 is connected through an automatic transmission 3, a propeller shaft 4, a final reduction gear 5 and an axle 6 to rear wheels 1RL and 1RR to transmit rotational power of engine 2 to rear wheels 1RL and 1RR. A brake actuator 7 constituted by a disc brake unit is installed to each of front and rear wheels 1FR, 1FL, 1RR and 1RL. Brake actuator 7 is of a hydraulic control type, and a brake control unit 8 controls brake hydraulic pressure applied to each brake actuator 7. The brake control unit 8 varies a hydraulic pressure according to a depression degree of a brake pedal 8a, and varies the hydraulic pressure according to a brake pressure command $P_{BR}$ from an adaptive cruise control (ACC) controller 20. An engine output control unit 11 is installed to engine 2 to control an output of engine 2. A throttle actuator 12 is installed to engine 2 and varies an opening of a throttle of engine 2. Engine output control unit 11 controls the throttle actuator 12 according to a depression degree of an accelerator pedal 11a and a throttle opening command $\theta_R$ outputted from ACC controller 20.

A vehicle speed sensor 13 is installed to an output shaft of automatic transmission 3 to detect a host vehicle speed $V_S$ of the host vehicle. Vehicle speed sensor 13 is constituted by an electromagnetic pickup which detects a positional change of a rotor gear attached to the output shaft of automatic transmission 3. Further, an inter-vehicle distance sensor 14 is installed to a frond and lower portion of a vehicle body, and detects an inter-vehicle distance between the host vehicle and a preceding vehicle traveling ahead of the host vehicle. Inter-vehicle distance sensor 14 is of a radar type which sweepingly emits laser beam in the forward direction and receives the reflection beam thereof to detect a distance to an obstacle reflecting the laser beam.

ACC controller 20 receives a detection signal outputted from vehicle speed sensor 13, a detection signal outputted from inter-vehicle distance sensor 14. When ACC controller 20 catches a preceding vehicle, ACC controller 20 controls the inter-vehicle distance so as to bring the distance closer to a target inter-vehicle distance determined by ACC controller 20. When ACC controller 20 does not catch the preceding vehicle, ACC controller 20 outputs brake hydraulic pressure command $P_{BR}$ and a target throttle opening $\theta_R$ to brake control unit 8 and engine output control unit 11, respectively, to control host vehicle speed $V_S$ at a set-speed $V_{SET}$ set at a vehicle speed setting device 20a by a driver of the host vehicle.

Figure 2:
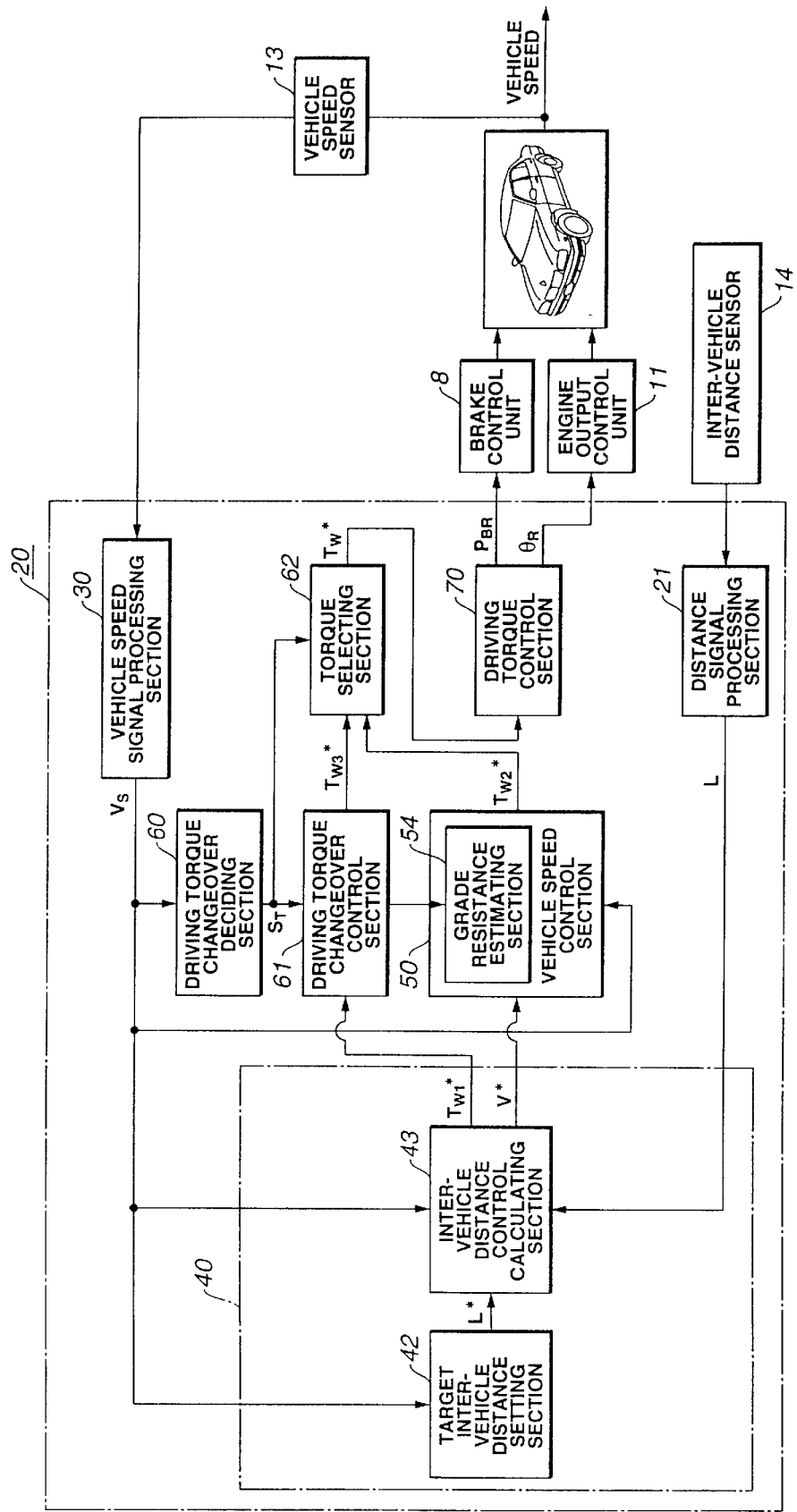
FIG. 2 is a block diagram showing a construction of an ACC controller of FIG. 1.

ACC controller 20 comprises a microcomputer and peripheral devices of the microcomputer and further comprises a control block in the form of software previously stored therein as shown in FIG. 2. This control block shown in FIG. 2 is constituted by a distance signal processing section 21, a vehicle speed signal processing section 30, an inter-vehicle distance control section 40, a vehicle speed control section 50, a driving torque changeover deciding section 60, a driving torque changeover control section 61, a torque selecting section 62, and a driving torque control section 70. Distance signal processing section 21 measures a time period from a moment of sweepingly emitting laser beam from inter-vehicle distance sensor 13 to a moment of receiving reflected beam of the preceding vehicle and calculates inter-vehicle distance L between the preceding vehicle and the host vehicle on the basis of the measured time period. Vehicle speed signal processing section 30 measures a cycle period of a vehicle speed indicative pulse outputted from vehicle speed sensor 13 and calculates host vehicle speed $V_S$ on the basis of the measured cycle period.

Inter-vehicle distance control section 40 calculates a target vehicle speed V* for maintaining inter-vehicle distance L at target inter-vehicle distance L* on the basis of inter-vehicle distance L calculated at distance signal processing section 21 and host vehicle speed VS calculated at vehicle speed signal processing section 30. Inter-vehicle distance control section 40 further calculates a first target driving torque $T_{W1}$*. Vehicle speed control section 50 calculates a second target driving torque $T_{W2}$* on the basis of target vehicle speed V* calculated at inter-vehicle distance control section 40. Driving torque changeover deciding section 60 decides a changeover of the driving torque on the basis of host vehicle speed $V_S$ calculated at vehicle speed signal processing section 30 and outputs a torque select signal $S_T$ indicative of the decision result. Drive-shaft torque changeover control section 61 calculates a third target driving torque $T_{W3}$* on the basis of torque select signal $S_T$ outputted from driving torque changeover deciding section 60 and first and second target driving torques $T_{W1}$* and $T_{W2}$*. Further, driving torque changeover control section 61 executes the matching of second and third target driving torques $T_{W2}$* and $T_{W3}$* when the content of torque select signal $S_T$ changes. Torque selecting section 62 selects one of second and third target driving torques $T_{W2}$* and $T_{W3}$* and sets the selected one as a target driving torque $T_W$*. Driving torque control section 70 calculates target throttle opening $\theta_R$ for controlling throttle actuator 12 and target brake hydraulic pressure $P_{BR}$ for controlling brake actuator 7 on the basis of target driving torque $T_W$*, and outputs target throttle opening $\theta_R$ and target brake hydraulic pressure $P_{BR}$ to engine output control unit 11 and brake control unit 8, respectively.

Inter-vehicle distance control section 40 comprises a target inter-vehicle distance setting section 42 and an inter-vehicle distance control calculating section 43. Target inter-vehicle distance setting section 42 calculates target inter-vehicle distance L* between the preceding vehicle and the host vehicle on the basis of host vehicle speed $V_S$ inputted from vehicle speed processing section 30. Inter-vehicle distance control calculating section 43 calculates target vehicle speed V* for bringing inter-vehicle distance L closer to target inter-vehicle distance L* on the basis of inter-vehicle distance L and host vehicle speed $V_S$.

Target inter-vehicle distance setting section 42 calculates target inter-vehicle distance L between the host vehicle and the preceding vehicle from host vehicle speed $V_S$ an a time duration (time gap) $T_0$ for reaching the host vehicle at a position apart from the preceding vehicle by the distance $L_0$ [m] and the following equation (1):

$$L^* = V_S \times T_0 + L_S, \quad (1)$$

where $L_S$ is an inter-vehicle distance when the vehicle is stopping. By employing the concept of this time gap, it becomes possible to increase the inter-vehicle distance according to the increase of the vehicle speed.

Further, inter-vehicle distance control calculating section 43 calculates first target driving torque $T_{W1}$* and target vehicle speed V* employed for execute the following of a preceding vehicle while keeping inter-vehicle distance L at target distance L*, on the basis of inter-vehicle distance L, target inter-vehicle distance L* and host vehicle speed $V_S$. More specifically, as shown in FIG. 3, inter-vehicle distance control calculating section 43 is arranged to calculate the relative speed $\Delta V$ from the equation (2) below, in a manner of calculating a change rate of inter-vehicle distance L by treating inter-vehicle distance L by means of a band-pass filter 43a.

$$\Delta V = K_0 \cdot s \cdot L / (s^2 + K_1 \cdot s + K_0), \quad (2)$$

where $K_0$ and $K_1$ are filter constants, and S is Laplace operator.

Figure 3:
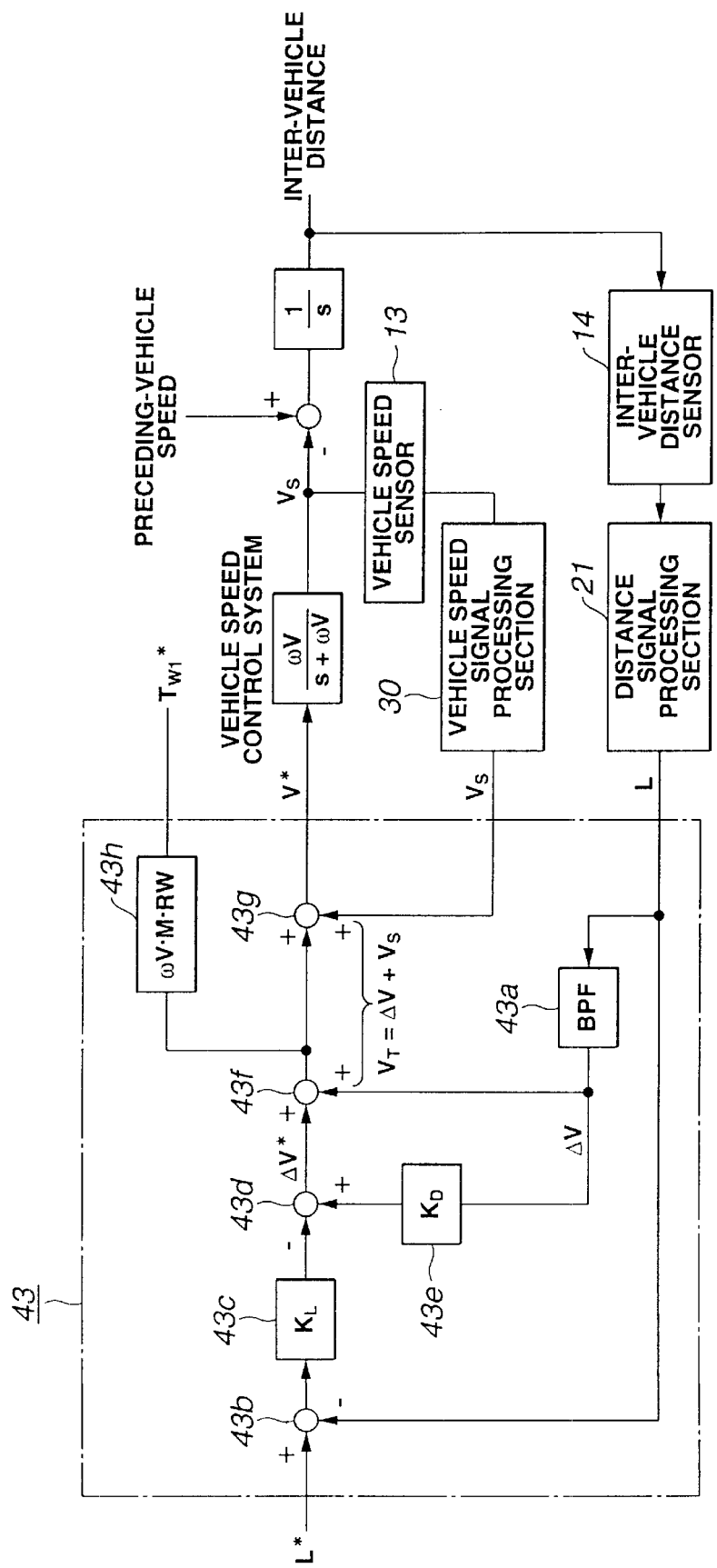
FIG. 3 is a block diagram showing a construction of an inter-vehicle distance control section of FIG. 2.

Assuming that the vehicle speed control system can be approximated by a first-order lag system which has a time constant $\tau_V$ (=1/$\omega$V) representative of a response of host vehicle speed $V_S$ with respect to the target vehicle speed V*, the inter-vehicle distance control system is constructed as shown in FIG. 3, and the transfer characteristics from target inter-vehicle distance L* to actual inter-vehicle distance L is expressed by the following equation (3):

$$L = \frac{1}{s}\left\{V_T - \frac{\omega V}{s + \omega V} V^*\right\} \quad (3)$$

Therefore, target vehicle speed V* is obtained by adding a target relative speed $\Delta V$* to preceding-vehicle speed $V_T$, where target relative speed $\Delta V$* is calculated from inter-vehicle distance L and relative speed $\Delta V$, as follows.

$$V^* = V_T + \Delta V^*, \quad (4)$$

where preceding-vehicle speed $V_T$ is obtained by adding relative speed $\Delta V$ to host vehicle speed $V_S$, as follows:

$$V_T = V_S + \Delta V. \quad (5)$$

By substituting equation (4) into equation (3), the transfer function from target relative speed $\Delta V^*$ to actual inter-vehicle distance L is expressed by the following equation (6):

$$L = \frac{1}{s}\left\{\frac{s}{s + \omega V} V_T - \frac{\omega V}{s + \omega V} \Delta V^*\right\}. \quad (6)$$

Next, in order to set relative speed $\Delta V$ under stationary state at zero by bring actual inter-vehicle distance L closer to target inter-vehicle distance L* with respect to the controlled object of equation (6), target relative speed $\Delta V^*$ is calculated from the following equation (7):

$$\Delta V^* = K_L(L^* - L) + K_D \cdot \Delta V. \quad (7)$$

Since equation (7) is a target value of the relative speed, target vehicle speed V* of the host vehicle is calculated by adding preceding vehicle speed $V_T$ to target relative speed $\Delta V^*$ as follows:

$$V^* = \Delta V^* + V_T. \quad (8)$$

Figure 4:
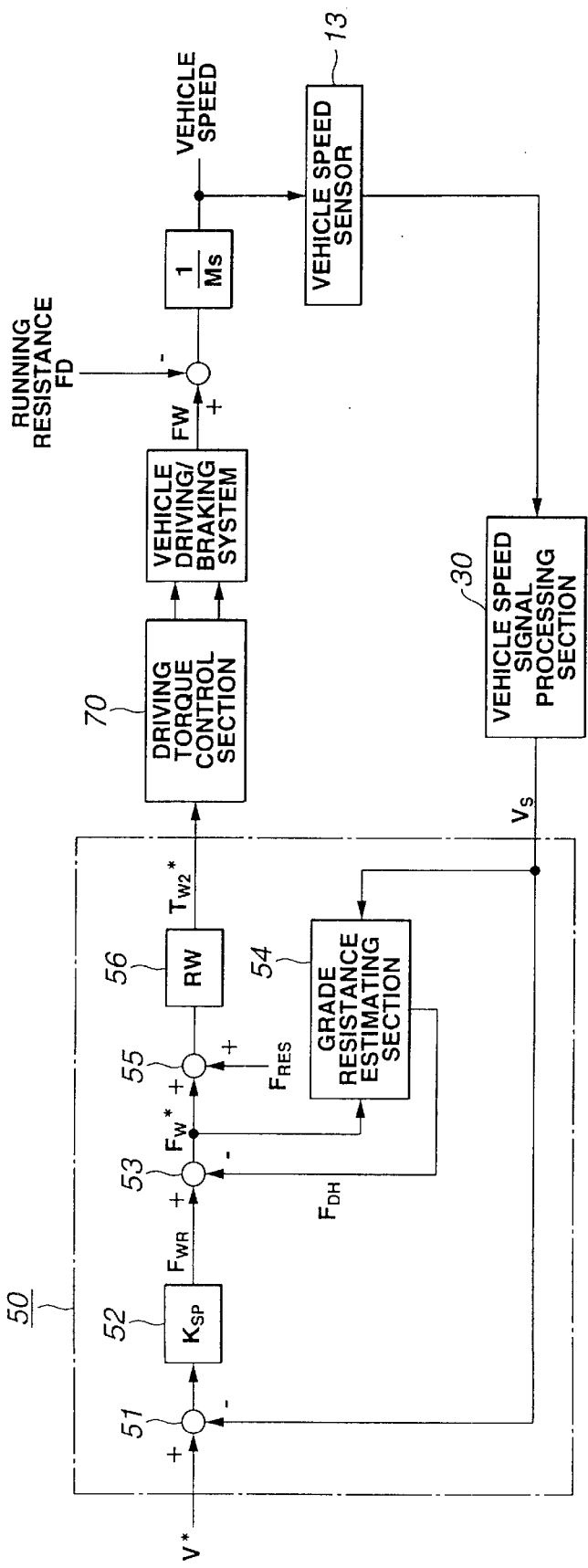
FIG. 4 is a block diagram showing a construction of a vehicle speed control section of FIG. 2.

FIG. 4 shows a block diagram of an inter-vehicle distance control system in case that the inter-vehicle distance is controlled based on the above-mentioned control rule. At this time, the transfer characteristic from target inter-vehicle distance L* to actual inter-vehicle distance L is expressed by the following equation (9):

$$L = \frac{\omega V \cdot K_L}{s^2 + \omega V(1 + K_D)s + \omega V \cdot K_L} L^* + \frac{s}{s^2 + \omega V(1 + K_D)s + \omega V \cdot K_L} V_T. \quad (9)$$

where $K_D$ is a relative speed gain, and $K_L$ is an inter-vehicle distance gain.

By properly setting relative speed gain $K_D$ and inter-vehicle distance gain $K_L$ of equation (9), it becomes possible to change a pole of equation (9) and to set the following response characteristic at a desired characteristic. More specifically, the calculation of equations (7) and (8) is executed in the block diagram of FIG. 3. That is, an inter-vehicle distance deviation (L*−L) is calculated by subtracting actual inter-vehicle distance L from target inter-vehicle distance L* at a subtracter 43b. The product of deviation (L*−L) and inter-vehicle distance gain $K_L$ is obtained at a multiplier 43c. At a subtracter 43d, the target relative speed $\Delta V^*$ is calculated by subtracting the value obtained at the multiplier 43c from a value obtained by multiplying relative speed $\Delta V$ and relative speed gain $K_D$ at a multiplier 43e. Further, relative speed $\Delta V$ and host vehicle speed $V_S$ are added to target relative speed $\Delta V^*$ at an adder 43f and an adder 43g. The sum $(\Delta V + V_S)$ of the added values corresponds to preceding vehicle speed $V_T$. By these calculations in the inter-vehicle distance control calculation section 43, target vehicle speed V* is calculated. Hereinafter, it will be proved that the calculation process of target vehicle speed V* in the inter-vehicle distance control calculation section 43 can calculate a value equivalent to an acceleration/deceleration command value of the vehicle.

Since the second term of right side in equation (3) is host vehicle speed $V_S$, an equation (10) below is obtained by substituting equations (4) and (5) into this relation as to host vehicle speed $V_S$.

$$V_S = \omega V \cdot V^*/(s + \omega V) \quad (10)$$
$$= \omega V(V_S + \Delta V + \Delta V^*)/(s + \omega V)$$

By coordinating equation (10), the following equation (11) is obtained.

$$V_S = \omega V(\Delta V + \Delta V^*)/s \quad (11)$$

It is noted from equation (11) that the value obtained by multiplying $\omega V$ and the sum of relative speed $\Delta V$ and target relative speed $\Delta V^*$ corresponds to the acceleration/deceleration command value. Therefore, first target driving torque $T_{W1}^*$ outputted from inter-vehicle distance control calculating section is expressed by the following equation (12):

$$T_{W1}^* = \omega V(\Delta V + \Delta V^*) \cdot M \cdot RW, \quad (12)$$

where M is a weight of vehicle, and RW is a tire radius.

Accordingly, by supplying the addition output $(\Delta V + \Delta V^*)$ of the adder 43f to the multiplier 43h and by multiplying a value $(\omega V \cdot M \cdot RW)$ indicative of a vehicle specification with the output $(\Delta V + \Delta V^*)$ as shown by the block diagram of FIG. 3, first target driving torque $T_{W1}^*$ is calculated.

Vehicle speed control section 50 is arranged to calculate second target driving torque $T_{W2}^*$ for bring host vehicle speed V closer to target vehicle speed V*. Vehicle speed control section 50 is arranged as shown by a block diagram of FIG. 4. Herein, it is assumed that the transfer lag of the driving torque control system is negligible. First, By calculating a running resistance $F_{RES}$, which is the sum of air resistance and rolling resistance, based on an equation (13) below and by previously adding the running resistance $F_{RES}$ into the controlled object, each running resistance is compensated.

$$F_{RES} = \mu A \cdot SV \cdot V_S^2 + \mu R \cdot M \cdot g, \quad (13)$$

where $\mu A$ is air resistance coefficient, SV is frontal projected area, $\mu R$ is rolling resistance coefficient, M is vehicle weight, and g is gravitational acceleration.

Grade resistance $F_{DH}$ is estimated from the calculation of an equation (14) below, target driving force F* and host vehicle speed $V_S$.

$$F_{DE} = H(s) \cdot M \cdot s \cdot V_S - H(s) \cdot F^*, \quad (14)$$

where H(s) is a low-pass filter which has a stationary gain of "1".

Target driving force $F_W^*$ is calculated by subtracting grade resistance estimate $F_{DH}$ from driving force command value $F_{WR}$ obtained by multiplying vehicle speed gain $K_{SP}$ and a deviation of target vehicle speed V* and host vehicle speed $V_S$. This calculation of target driving force $F_W^*$ functions to eliminate interference of the grade resistance and so on with respect to the transfer characteristic from driving force command value $F_{WR}$ to host vehicle speed $V_S$.

$$F_W^* = F_{WR} - F_{DE} \quad (15)$$

By adding running resistance estimate $F_{RES}$ to target driving force $F_W^*$ calculated by equation (15) and by multiplying the tire radius to this sum as expressed by an equation (16) below, second target driving torque $T_{W2}^*$ is calculated.

$$T_{W2}^* = RW(F_W^* - F_{RES}) \tag{16}$$

Assuming that disturbance to the transfer characteristic from driving force command value $F_{WR}$ to host vehicle speed $V_S$ shown in FIG. 4 was eliminated by the running resistance compensation, transfer characteristic $G_V$ is represented by the following equation (17):

$$G_V(S) = V_S(S)/F_{WR}(S) = 1/M \cdot s. \tag{17}$$

A driving force command $F_{WR}$ receiving this transfer characteristic $G_V(s)$ as a new controlled object is calculated based on the following equation (18):

$$F_{WR} = K_{SP}(V^* - V_s). \tag{18}$$

Accordingly, the transfer characteristic from target vehicle speed $V^*$ to actual vehicle speed $V_S$ is represented by an equation (19) below, and therefore it becomes possible that the response of the vehicle speed control system is adjusted to the desired response characteristic.

$$V_S = (K_{SP}/M)V^*/(s + K_{SP}/M) \tag{19}$$

In the block diagram of FIG. 4, subtracter 51 calculates the vehicle speed deviation by subtracting host vehicle speed $V_S$ from target vehicle speed $V^*$. Multiplier 52 calculates driving force command value $F_{WR}$ by multiplying vehicle speed gain $K_{SP}$ to the vehicle speed deviation. Grade resistance estimating section 54 calculates grade resistance estimate $F_{DH}$ based on target driving force $F_W^*$ and host vehicle speed $V_S$ and from equation (14). Subtracter 53 calculates target driving force $F_W^*$ by subtracting grade resistance estimate $F_{DH}$ calculated at grade resistance estimating section 54 from the driving force command $F_{WR}$. Adder 55 obtains the sum of target driving force $F_W^*$ and running resistance $F_{RES}$. Multiplier 56 calculates second target driving torque $T_{W2}^*$ by multiplying a tire radius RW to the sum obtained at adder 55.

Driving torque changeover deciding section 60 generates a torque select signal $S_T$ for selecting the target driving torque. The decision as to whether torque select signal $S_T$ is generated is executed by deciding whether host vehicle speed $V_S$ is smaller than or equal to a vehicle speed which ensures a vehicle speed detecting time by which a safety margin of the vehicle speed control system becomes greater than a predetermined value. It is assumed that it is necessary that the time lag due to the vehicle speed detection is smaller than or equal to a value Tmg(s) in order to ensure a predetermined safety margin Gmg(dB) of the vehicle speed control system, and that an interval of the vehicle speed pulses becomes greater than a value Tmg(s) when the vehicle speed is smaller than or equal to a value Vmg (km/h). If so, when the vehicle speed is smaller that value Vmg (km/h), the safety margin cannot be ensured, and therefore the changeover of the target driving torque is executed. If an electromagnetic pickup is employed, changeover decision vehicle speed Vmg (km/h) may be set at a vehicle speed at which a vehicle speed pulse voltage cannot become detected. This decision has been previously calculated, and a changeover vehicle speed $V_{CHG}$ for generating the torque changeover has been preset. Further, in order to avoid the torque changeover from being frequently executed in the vicinity of changeover vehicle speed $V_{CHG}$, a hysteresis is provided. More specifically, the hysteresis is set such that the theoretical value of the torque select signal $S_T$ is set at "1" when $V_S \leq V_{CHG}$, and that the theoretical value is set a "0" when $V_S > V_{CHG} + \Delta V_{CHG}$, where $\Delta V_{CHG}$ is a hysteresis width.

The driving torque changeover control section 61 calculates a third target driving torque $T_{W3}^*$ based on torque select signal $S_T$ outputted from the driving torque select deciding section 60 and first target driving torque $T_{W1}^*$. More specifically, by deceleration of the vehicle speed of the preceding vehicle from a condition that the theoretical value of torque select signal $S_T$ is "0", when host vehicle speed $V_S$ becomes smaller than or equal to predetermined changeover vehicle speed $V_{CHG}$ and when torque select signal $S_T$ is turned to "1", first target driving torque $T_{W1}^*(k)$ is selected instead of second target driving torque $T_{W2}(k-1)$ at torque selecting section 62. Although the second target driving torque $T_{W2}^*$ has been set upon taking account of the running resistance including road grade, first target driving torque $T_{W1}^*$ has been set without taking account of the running resistance. Therefore, a deviation between first and second target driving torques $T_{W1}^*$ and $T_{W2}^*$ increases according to the increase of the road grade. By calculating a torque deviation $\Delta T_{W1}$ between second and first target driving torques $T_{W2}^*$ and $T_{W1}^*$ according to an equation (20) below, by latching the deviation and by adding torque deviation $\Delta T_{W1}$ to first target driving torque $T_{W1}^*$, third target driving torque $T_{W3}$ corresponded to second target driving torque $T_{W2}^*$ is calculated. Further, since the feedback of grade resistance estimate $F_{DH}$ at vehicle speed control section 50 provides a function as same as the integral thereof, grade resistance estimate $F_E$ is set at "0" by outputting a reset signal $S_R$ indicative of a theoretical value "1" to grade resistance estimating section 54 and resetting an inner variable employed in the calculation of the grade resistance at grade resistance estimating section 54.

$$\Delta T_{W1} = T_{W2}^* - T_{W1}^*(k) \tag{20}$$

$$T_{W3}^*(k) = \Delta T_{W1} + T_{W1}^*(k) \tag{21}$$

In reverse, when torque select signal $S_T$ was switched from "1" to "0", torque selecting section 62 selects second target driving torque $T_{W2}^*(k)$ instead of third target driving torque $T_{W3}^*(k-1)$. Therefore, torque deviation $\Delta T_{W2}$ between third and second target driving torques $T_{W3}^*(k)$ and $T_{W2}^*(k)$ is calculated according to an equation (22) below. Further, torque deviation $\Delta T_{W2}$ is outputted to grade resistance estimating section 54, and the theoretical value of reset signal $S_R$ is set at "0". Therefore, second target driving torque $T_{W2}^*$ outputted from vehicle speed control section 50 is offset to the negative direction by an initial value $F_{DHO}$ with respect to previous second target driving torque $T_{W2}^*$ as represented by an equation (23) below, and is adjusted to third target driving torque $T_{W3}^*$.

$$\Delta T_{W2} = T_{W2}^*(k) - T_{W3}^*(k) \tag{22}$$

$$T_{W3}^*(k) = T_{W2}^*(k) - F_{DHO} \tag{23}$$

Figure 5:
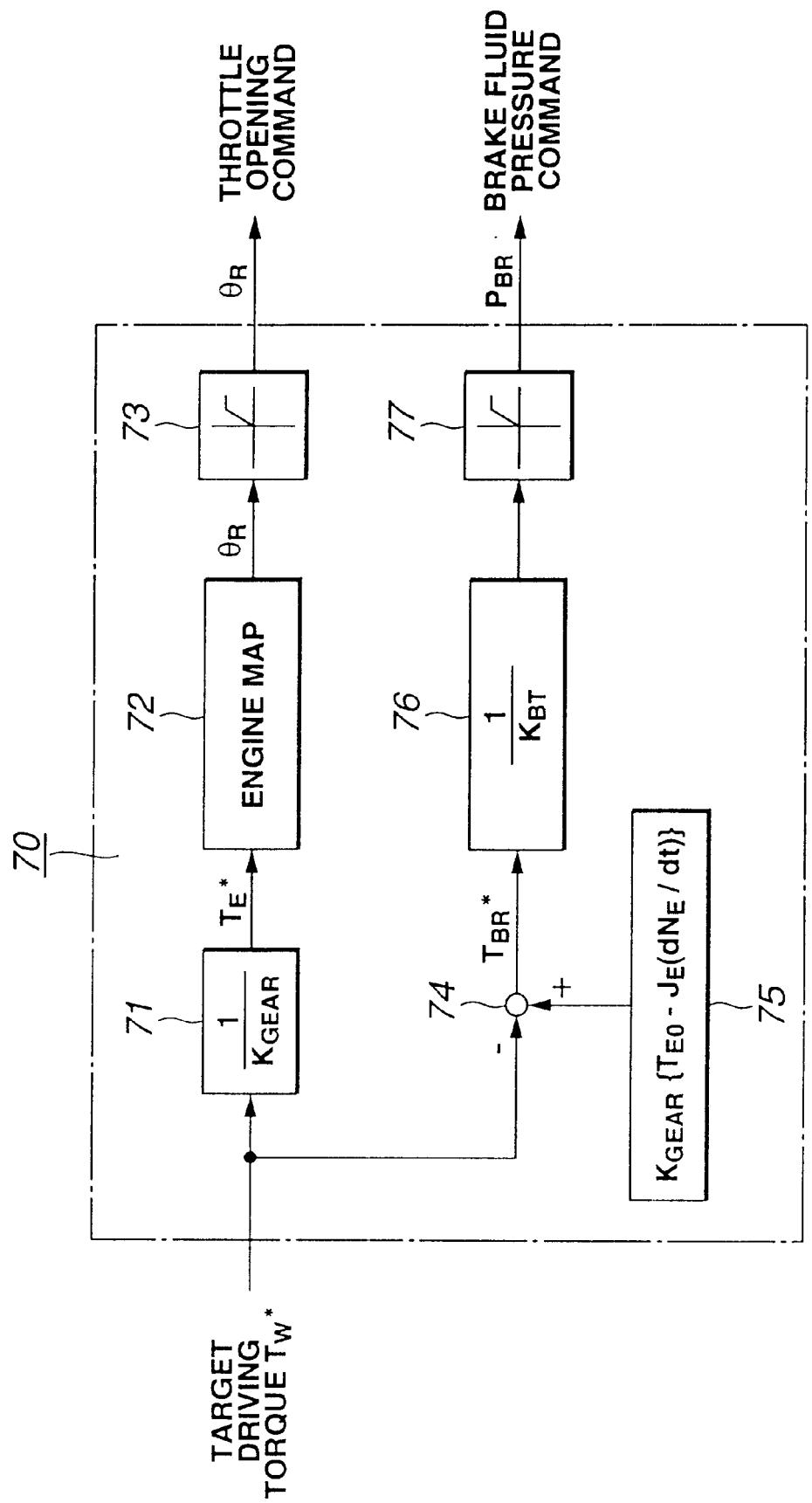
FIG. 5 is a block diagram showing a construction of a driving torque control section of FIG. 2.

Further, torque selecting section 62 selects second target driving torque $T_{W2}^*$ outputted from vehicle speed control section 50 when the theoretical value of torque select signal $S_T$ inputted from driving torque changeover deciding section 60 is "0" and outputs second target driving torque $T_{W2}^*$ to driving torque control section 70 as target driving torque $T_W^*$. Further, torque selecting section 62 selects third target driving torque $T_{W3}^*$ outputted from vehicle speed control section 50 when the theoretical value of torque select signal $S_T$ is "1", and outputs third target driving torque $T_{W3}^*$ to driving torque control section 70 as target driving torque $T_W^*$. Driving torque control section 70 calculates throttle opening command $\theta_R$ and brake hydraulic pressure command $P_{BR}$ for realizing target driving torque $T_W^*$ selected at the torque selecting section, as shown in FIG. 5.

Assuming that a torque amplification ratio of a torque converter is $R_T$, a gear ratio of the automatic transmission 3 is $R_{AT}$, a gear ratio of a differential is $R_{DEF}$, engine inertia is $J_E$, and an engine speed is $N_E$, a relationship among driving torque $T_W$, engine torque $T_E$ and brake torque $T_{BR}$ is represented by the following equation (24):

$$T_W = K_{GEAR}\{T_E - J_E(dN_E/dt)\} - T_{BR}, \quad (24)$$

where $K_{GEAR} = R_T \cdot R_{AT} \cdot R_{DEF}$.

Figure 6:
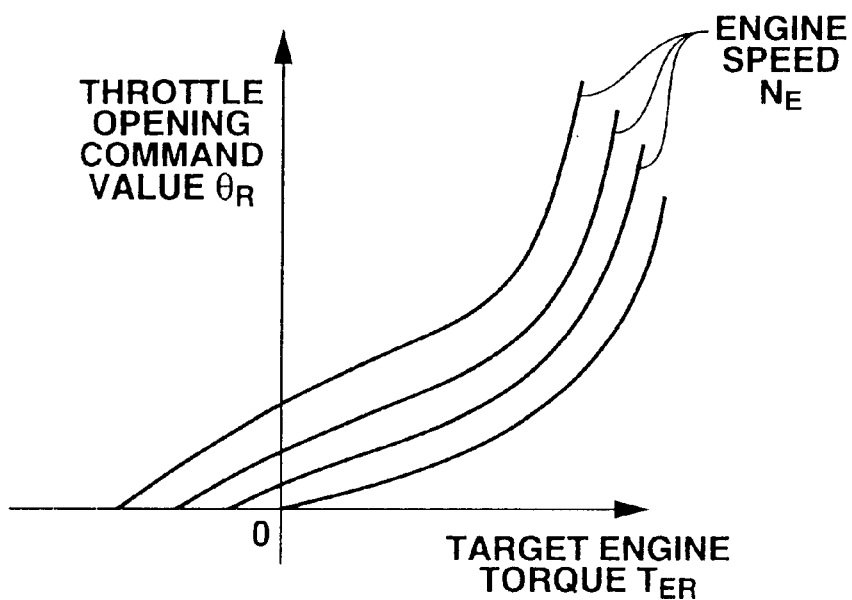
FIG. 6 is a graph showing an engine operation map employed for obtaining a throttle opening from an engine torque.

Accordingly, throttle opening command $\theta_R$ for generating target engine torque $T_E^*$ is calculated by calculating target engine torque $T_E^*$ with respect to target driving torque $T_W^*$ from an equation (25) below and by retrieving an engine map sown in FIG. 6.

$$T_E = J_E(dN_E/dt) + T_W^*/K_{GEAR} \quad (25)$$

Herein, if throttle opening command $\theta_R$ is greater than or equal to "0", actual driving torque $T_W$ is brought closer to target driving torque $T_W^*$ only by engine torque. On the other hand, if throttle opening command $\theta_R$ is smaller than "0", the throttle opening is recognized as "0" and the brake operation quantity for bringing the driving torque to target driving torque $T_W^*$ is calculated upon taking account of the driving torque outputted by engine 2.

That is, the distribution control rule of target engine torque $T_E^*$ and target brake torque $T_{BR}^*$ is summarized as follows:

(A) When $\theta_R > 0$, $T_{BR}^* = 0$. Therefore, equation (24) under the condition (A) is represented by the following equation (26):

$$T_W = K_{GEAR}\{T_E - J_E(dN_E/dt)\}. \quad (26)$$

Accordingly, target engine torque $T_E^*$ obtained by equation (27) may be generated with respect to target driving torque $T_W^*$.

$$T_E^* = J_E(dN_E/dt) + T_W^*/K_{GEAR} \quad (27)$$

Herein, since target brake torque $T_{BR}$ is "0", brake hydraulic pressure command $P_{BR}$ is "0".

Figure 7:
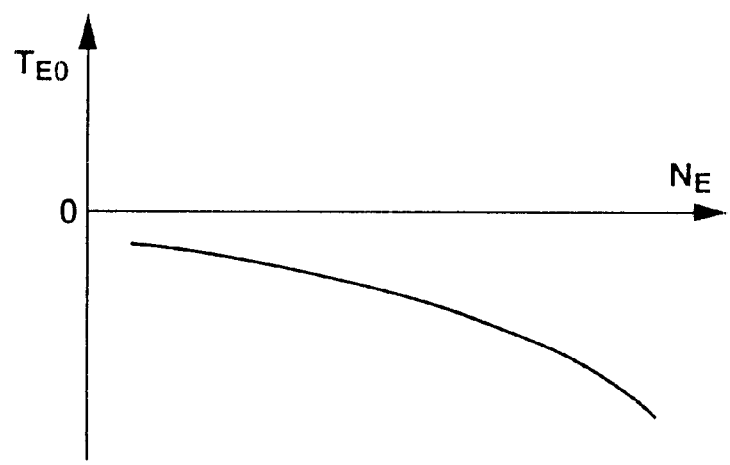
FIG. 7 is a graph showing a relationship between an engine speed and the engine torque under a condition that the throttle opening is zero.

(B) When $\theta_R \leq 0$, engine torque $T_{EO}$ under a condition of $\theta_R = 0$ is calculated based on engine speed $N_E$ and with reference to the engine torque map shown in FIG. 7. Accordingly, equation (24) under this condition (B) is represented by the follow equation (28):

$$T_E^* = K_{GEAR}\{T_{EO} - J_E(dN_E/dt)\} - T_{BR}. \quad (28)$$

Therefore, target brake torque $T_{BR}^*$ with respect to target driving torque $T_W^*$ is represented by the following equation (29):

$$T_{BR}^* = -T_W^* + K_{GEAR}\{T_{EO} - J_E(dN_E/dt)\}. \quad (29)$$

Assuming that a bake cylinder area is $A_B$, a rotor effective radius is $R_B$, and a pad friction coefficient is $\mu B$, the brake hydraulic command $P_{BR}$ indicative of the brake operation quantity with respective to the target brake torque $T_{BR}^*$ is represented by the following equation (30):

$$P_{BR} = (1/K_{BT}) \cdot T_{BR}^*, \quad (30)$$

where $K_{BT} = 8 \cdot A_B \cdot R_B \cdot \mu_B$.

Accordingly, driving torque control section 70 is arranged as shown by a block diagram of FIG. 5. More specifically, a divider 71 receives target driving torque $T_W^*$ and calculates a target engine torque $T_W^*$ by dividing target driving torque $T_W^*$ by a coefficient $K_{GEAR}$. A throttle opening calculating section 72 receives target engine torque $T_E^*$ and calculates throttle opening command $\theta_R$ based on target engine torque $T_E^*$ and engine speed $N_E$ and with reference to an engine characteristic map shown in FIG. 6. A limiter 73 receives the throttle opening command $\theta_R$ and limits the throttle opening command $\theta_R$ within a range from zero to a maximum throttle opening controllable by throttle actuator 12. Limiter 73 outputs limited throttle opening command $\theta_R$ to engine output control unit 11. A subtracter 74 calculates target brake torque $T_{BR}^*$ by subtracting target driving torque $T_W^*$ from a value $K_{GEAR}\{T_{EO} - J_E(dN_E/dt)\}$ which is a second term of a right side in equation (29). A divider 76 receives target brake torque $T_{BR}^*$ calculated at subtracter 74 and calculates brake hydraulic pressure command $P_{BR}$ by executing the calculation of equation (30). A limiter 77 limits brake hydraulic pressure command $P_{BR}$ within a range from zero to a maximum braking pressure controllable by brake actuator 7 and outputs limited brake hydraulic pressure command $P_{BR}$ to brake control unit 8.

The following control processing executed by ACC controller 20 of the first embodiment according to the present invention will be discussed with reference to a flowchart of FIG. 8. This following control processing is executed as a timer interruption process at predetermined intervals (10 msec) with respect to a predetermined main program.

At step S1, ACC controller 20 reads host vehicle speed $V_S$ processed by vehicle speed signal processing section 30, and decides whether or not host vehicle speed $V_S$ is smaller than or equal to changeover vehicle speed $V_{CHG}$. When the decision at step S1 is affirmative ($V_S \leq V_{CHG}$), the routine proceeds to step S2 wherein ACC controller 20 sets host vehicle speed $V_S$ at zero (VS=0). When the decision at step S1 is negative ($V_S > V_{CHG}$), the routine proceeds to step S3.

At step S3, ACC controller 20 calculates target inter-vehicle distance L* by executing the calculation of equation (1) based on host vehicle speed $V_S$.

At step S4, ACC controller 20 calculates relative speed $\Delta V$ by executing the band-pass filter treatment as to equation (2) based on inter-vehicle distance L detected by inter-vehicle distance sensor 14.

At step S5, ACC controller 20 calculates target vehicle speed V* by executing the calculations of equations (7) and (8), and calculates first target driving torque $T_{W1}^*$ by executing the calculation of equation (12).

At step S6, ACC controller 20 decides whether reset flag RS is set at 1 or not. When the decision at step S6 is affirmative (RS=1), the routine proceeds to step S7 wherein grade resistance estimate $F_{DH}$ is set at zero ($F_{DH} = 0$), and proceeds then to step S9. When the decision at step S6 is negative (RS=0), the routine proceeds to step S8 wherein ACC controller 20 calculates grade resistance estimate $F_{DH}$ by executing the calculation of equation (14).

At step S9, ACC controller 20 calculates second target driving torque $T_{W2}^*$ by executing calculations of equations (13), (15) and (16).

At step S10, ACC controller 20 decides whether or not host vehicle speed $V_S$ is smaller than or equal to changeover vehicle speed $V_{CHG}$. When the decision at step S10 is affirmative ($V_S \leq V_{CHG}$), the routine proceeds to step S11 wherein a present torque select flag TS(k) is set at 1 (TS(k)=1). When the decision at step S10 is negative ($V_S > V_{CHG}$), the routine proceeds to step S12 wherein ACC controller 20 decides whether or not host vehicle speed $V_S$ is greater than the sum of changeover vehicle speed $V_{CHG}$ and hysteresis width $\Delta V_{CH}$. When the decision at step S12 is affirmative ($V_S > V_{CHG} + \Delta V_{CHG}$), the routine proceeds to step S13 wherein present torque select flag TS(k) is set at 0 (TS(k)=0). When the decision at step S12 is negative ($V_S > V_{CHG} + \Delta V_{CHG}$), the routine proceeds to step S14 wherein present torque select flag TS(k) is set at a previous torque select flag TS(k−1) (TS(k)=TS(k−1)).

At step S15 following to the execution of step S11, S13 or S14, ACC controller 20 decides whether or not torque select flag TS(k) is set at 1. When the decision at step S15 is affirmative (TS(k)=1), the routine proceeds to step S16. When the decision at step S15 is negative (TS(k)=0), the routine proceeds to step S21.

At step S16, ACC controller 20 decides whether or not it is put in a torque select time where previous torque select flag TS(k−1) is set at 0. When the decision at step S16 is affirmative (TS(k−1)=0), the routine proceeds to step S17 wherein torque deviation $\Delta T_{W1}$ is calculated by executing calculation of equation (20). After the execution of step S17, the routine proceeds to step S18. When the decision at step S16 is negative (TS(k−1)=0), the routine proceeds to step S18.

At step S18, ACC controller 20 calculates third target driving torque $T_{W3}^*$ by executing the calculation of equation (21).

At step S19, ACC controller 20 sets reset flag RS at 1 (RS=1).

At step S20, ACC controller 20 calculates throttle opening command $\theta_R$ and brake hydraulic pressure command $P_{BR}$ by executing the calculations of equations (24) to (30) and outputs throttle opening command $\theta_R$ and brake hydraulic pressure command $P_{BR}$ to engine output control unit 11 and brake control unit 8, respectively. Thereafter, the present routine is terminated, and the routine returns to the predetermined main program.

On the other hand, when the decision at step S15 is negative (TS(k)=0), the routine proceeds to step S21 wherein ACC controller 20 decides whether or not it is put in a torque select time where previous torque select flange TS(k−1) is set at 1. When the decision at step S21 is affirmative, the routine proceeds to step S22 wherein torque deviation $\Delta T_{W2}$ is calculated by executing calculation of equation (22).

At step S23 following to the execution of step S22, ACC controller 20 sets torque deviation $\Delta T_{W2}$ as an initial value $F_{DHO}$ employed for calculating the grade resistance, and calculates second target driving torque $T_{W2}^*$ by executing the calculations of equations (13), (15) and (16) on the basis of initial value $F_{EHO}$.

At step S24 following to the negative decision at step S21 or execution of step S23, ACC controller 20 sets second target driving torque $T_{W2}^*$ as target driving torque $T_W^*$. Thereafter, the routine proceeds to step S25 wherein reset flag RS is reset at 0. Then, the routine proceeds to step S20.

In the following control processing shown in FIG. 8, the processing at step S3 corresponds to target inter-vehicle distance calculating means, the processing at steps S4 and S5 corresponds to vehicle speed control means, the processing at steps S10 to S14 corresponds to driving torque deciding means, the processing at step S15 to S19 corresponds to driving torque select and match means, and the processing at step S20 corresponds to driving/braking force generating means.

Figure 9A:
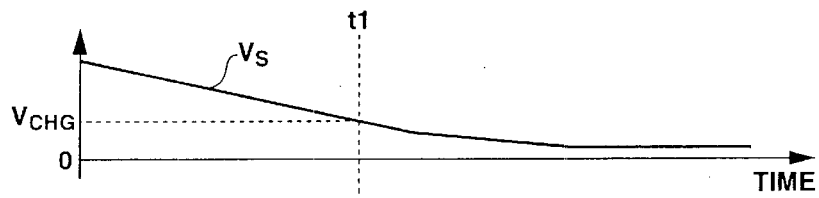
FIGS. 9A to 9C are time-charts of the host vehicle speed, the torque select flag and the target driving torque during the selecting of target driving torque under a decelerating condition of the host vehicle.

It is now assumed that a set switch of the following control is put in an ON state, and therefore the following control is being executed, and host vehicle speed $V_S$ is put in a normal running condition where host vehicle speed $V_S$ is greater than changeover vehicle speed $V_{CHG}$, and the host vehicle is decelerated according to the deceleration of the preceding vehicle, as shown in FIG. 9A.

Figure 8:
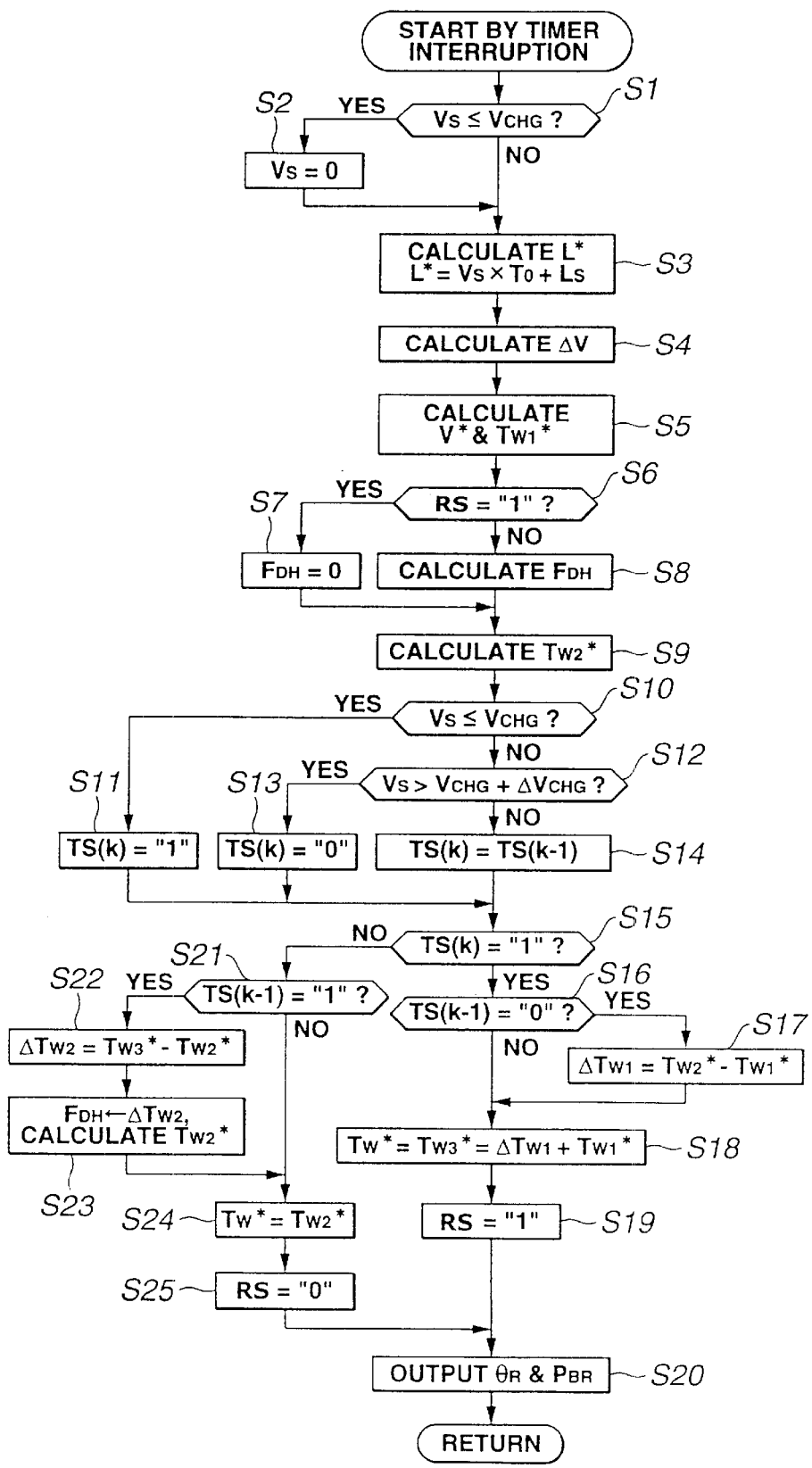
FIG. 8 is a flowchart showing a following control executed by the ACC controller.

Under this condition, at step S3 of the processing of FIG. 8, target inter-vehicle distance L* is calculated, and at steps S4 and S5, target vehicle speed V* and first target driving torque $T_{W1}^*$ are calculated. At this time, the preceding vehicle is decelerated, and the inter-vehicle distance L detected by inter-vehicle distance sensor 14 is smaller than target inter-vehicle distance L*. Therefore, first target driving torque $T_{W1}^*$ takes a negative value as shown by a broken line of FIG. 9C. Next, at step S8, grade resistance estimate $F_{DH}$ is calculated, and at step S9 second target driving torque $T_{W2}^*$, which takes a negative value smaller than first target driving torque $T_{W1}^*$ due to running resistance as shown in FIG. 9C, is calculated.

Since host vehicle speed $V_S$ is greater than changeover vehicle speed $V_{CHG}$ or the sum of changeover vehicle speed $V_{CHG}$ and hysteresis $\Delta V_{CHG}$, the following control routine proceeds to step S13 wherein torque select flag TS is reset (TS(k)=0). Then, the routine proceeds through steps S15 and S21 to step S24 wherein second target driving torque $T_{W2}^*$ calculated at step S9 is set as target driving torque $T_W^*$. Although throttle opening θ indicative of negative value is calculated based on target driving torque $T_W^*$ with reference to the engine torque map of FIG. 7, the throttle opening θ0 calculated is limited at zero by limiter 73. Accordingly, throttle opening command $\theta_R$ commanding zero is outputted to engine output control unit 11, and therefore the throttle opening is controlled at zero by means of throttle actuator 12.

Simultaneously, target driving torque $T_W^*$ is negative, throttle opening θ is negative and throttle opening command $\theta_R$ is zero. Accordingly, engine torque $T_{EO}$ calculated with reference to the engine torque map of FIG. 7 takes negative value. Further, engine brake torque $T_{EB}$ represented by $K_{GEAR}\{T_{EO} - J_E(dN_E/dt)\}$ takes a negative value, and therefore target brake torque $T_{BR}^*$ calculated from equation (29) takes a positive value. Brake hydraulic pressure command $P_{BR}$ is calculated by executing the calculation of equation (30) based on target brake torque $T_{BR}^*$ and is outputted to brake control unit 8. Therefore, brake control unit 8 controls the brake pressure of brake actuator 7, and therefore braking state of brake actuator 7 is maintained and the deceleration condition of the host vehicle is continued.

When host vehicle speed $V_S$ becomes smaller than or equal to changeover vehicle speed $V_{CHG}$ at the time t1 due to the reason that the preceding vehicle is decelerated and travels at extremely low speed due to approaching traffic snarl, the measurement accuracy of host vehicle speed $V_S$ degrades due to elongation of detection pulse interval outputted from vehicle speed sensor 13. However, since host vehicle speed $V_S$ has been set at zero by the execution of steps S1 and S2, target inter-vehicle distance L* calculated at step S3 is set as inter-vehicle distance $L_S$ during vehicle stopping state.

At time t1, first target driving torque $T_{W1}^*$ calculated at step S5 on the basis of target inter-vehicle distance L* and actual inter-vehicle distance L is greater than second target driving torque $T_{W2}^*$, which calculated at step S9 and is feedback controlled as to grade estimate $F_{DH}$, by torque deviation $\Delta T_{W1}$, as shown in FIG. 9C.

Figure 9B:
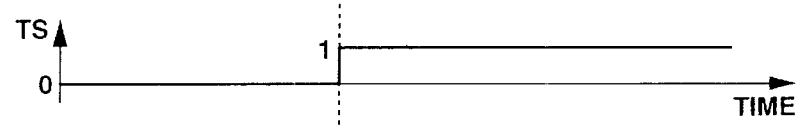
Figure 9C:
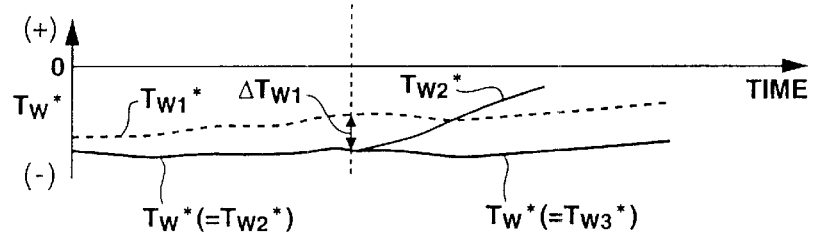

Since torque select flag TS is set at 1 as shown in FIG. 9B by the execution of steps S10 and S11 of the following control process of FIG. 8, the routine proceeds from step S15 to step S16 wherein torque select flag TS is changed from 0 to 1. Therefore, the routine proceeds to step S17 wherein torque deviation $\Delta T_{W1}$ taking a negative value is calculated by executing the calculation of equation (20). Then, the routine proceeds to step S18 wherein third target driving torque $T_{W3}*(k)$ is calculated by adding torque deviation $\Delta T_{W1}$ to first target driving torque $T_{W1}*(k)$ and is set as target driving torque $T_W*(k)$. Next, the routine proceeds to step S19 wherein reset flag RS is set at 1 (RS=1). Then, the routine proceeds to step S20 wherein throttle opening command $\theta_R$ and brake hydraulic pressure command $P_{BR}$ are outputted.

At this time, since third target driving torque $T_{W3}*(k)$ is put in a torque matching condition where it is matched with second target driving torque $T_{W2}*$, the changeover of target driving torque $T_W*$ from second target driving torque $T_{W2}*$ (k−1) to third target driving torque $T_{W3}*(k)$ is smoothly executed without generating torque fluctuation. Accordingly, it is possible to maintain previous braking state without generating change of deceleration.

Thereafter, when the preceding vehicle continues extremely low-speed traveling due to traffic snarl, in the following control processing of FIG. 8 after the predetermined time period elapsed, the routine proceeds from step S6 to step S7 since reset flag RS has been set at 1. Accordingly, the internal variable for the running resistance calculation in the vehicle speed control is reset, and grade estimate $F_{DH}$ is set at zero. Although second target driving torque $T_{W2}*$ calculated at step S9 takes a value greater than third target driving torque $T_{W3}*$, target inter-vehicle distance $L*$ is kept at stopping-state inter-vehicle distance $L_S$. Accordingly, first target driving torque $T_{W1}*$ is calculated so as to keep inter-vehicle distance $L_S$, and third target driving torque $T_{W3}*$ obtained by adding torque deviation $\Delta T_{W1}$ to first target driving torque $T_{W1}*$ is set as target driving torque $T_W*$. Consequently, the following control under extremely low-speed is continued without depending on inaccurate host vehicle speed $V_S$.

Figure 10A:
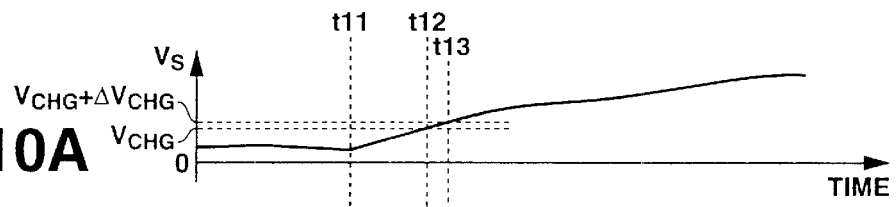
FIGS. 10A to 10C are time-charts of the host vehicle speed, the torque select flag and the target driving torque during the selecting of target driving torque under a accelerating condition of the host vehicle.
Figure 10B:
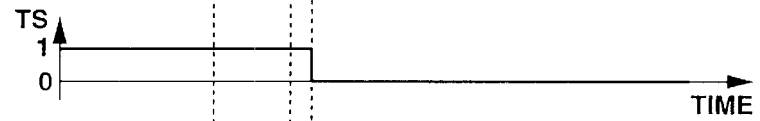
Figure 10C:
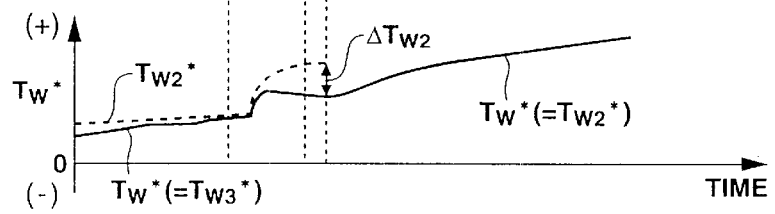

When the host vehicle travels at this extremely low-speed due to traffic snarl and when the vehicle speed is generated by creeping phenomenon of automatic transmission 3, if inter-vehicle distance L detected by inter-vehicle speed sensor 14 becomes greater than target inter-vehicle distance $L*$ set at stopping-state inter-vehicle distance $L_S$, third target driving torque $T_{W3}*(k)$ takes a positive value, as shown in FIG. 10C. Further, throttle opening command $\theta_R$ increases according to the change of third target driving torque $T_{W3}*$ (k), and the throttle valve is slightly opened by throttle actuator 12.

Thereafter, at time t11, the preceding vehicle starts accelerating, and inter-vehicle distance L becomes greater than target inter-vehicle distance $L*$ according to the acceleration of the preceding vehicle. Accordingly, third target driving torque $T_{W3}*(k)$ increases as shown by a continuous line of FIG. 10A, and second target driving torque $T_{W2}*(k)$ increases, as shown by a broken line of FIG. 10A, so as to become greater than third target driving torque $T_{W3}*(k)$. However, since host vehicle speed $V_S$ is kept at a vehicle speed smaller than changeover vehicle speed $V_{CHG}$, third target driving torque $T_{W3}*$ is continuously set as target driving torque $T_W*$, and the acceleration control of the host vehicle is executed on the basis of this target driving torque $T_W*$.

Thereafter, when host vehicle speed $V_S$ becomes greater than changeover vehicle speed $V_{CHG}$ at time t12, the routine of FIG. 8 proceeds from step S10 to step S12. However, since host vehicle speed $V_S$ is still smaller than the sum of changeover vehicle speed $V_{CHG}$ and hysteresis width $\Delta V_{CHG}$, the routine proceed to step S14 wherein torque select flag TS is maintained at 1, and therefore the acceleration control of the host vehicle is continued by employing third target driving torque $T_{W3}*(k)$.

Thereafter, when host vehicle speed $V_S$ becomes greater than the sum of changeover vehicle speed $V_{CHG}$ and hysteresis width $\Delta V_{CHG}$ at time t13, the routine of FIG. 8 proceeds from step S12 to step S13 wherein torque select flag TS(k) is reset at 0 (TS(k)=0). Therefore, the routine proceeds from step S15 to step S21 wherein affirmative decision is made since previous torque select flag TS(k−1) is set at 1 (TS(k−1)=1). Then, the routine proceeds to step S22 wherein torque deviation $\Delta T_{W2}$ is calculated by subtracting third target driving torque $T_{W3}*(k)$ from second target driving torque $T_{W2}*(k)$ according to equation (22). Next, the routine proceeds from step S22 to step S23 wherein torque deviation $\Delta T_{W2}$ is set as initial value $F_{DHO}$ employed in the grade resistance calculation of equation (14). Further, at step S23, target driving force F is calculated based on initial value $F_{HO}$ by executing the calculation of equation (15), and second target driving torque $T_{W2}*(k)$ is calculated by executing the calculation of equation (16).

Second target driving torque $T_{W2}*(k)$ is the sum of grade resistance estimate $F_{DHO}$ and previous second target driving torque $T_{W2}*(k-1)$ calculated at step S9 under a condition of $F_{DH}=0$. Therefore, it becomes possible to match second target driving torque $T_{W2}*(k)$ with third target driving torque $T_{W3}*(k)$ in torque matching. This enables smooth changeover of target driving torque $T_W*$ from third driving torque $T_{W3}*(k-1)$ to second driving torque $T_{W2}*(k)$. Therefore, accelerating condition is continued without generating change of acceleration.

Thereafter, when the processing shown in FIG. 8 is executed after the predetermined time elapsed, since reset flag RS has been reset at 0 (RS=0), the routine of FIG. 8 proceeds from step S6 to step S8 wherein grade resistance estimate is calculated based on initial value $F_{DHO}$. Accordingly, grade resistance estimate $F_{DH}$ is gradually converged to a value corresponding to the road grade, and the control condition of the host vehicle is returned to the normal following condition.

With the thus arranged embodiment according to the present invention, when host vehicle speed $V_S$ is greater than changeover vehicle speed $V_{CHG}$ and is accurately detected by vehicle speed sensor 13, ACC controller 20 selects second target driving torque $T_{W2}*$. On the other hand, when host vehicle speed $V_S$ is smaller than or equal to changeover vehicle speed $V_{CHG}$, ACC controller 20 selects third target driving torque $T_{W3}*$ which is not affected by host vehicle speed $V_S$ detected by vehicle speed sensor 13. Therefore, the following control is smoothly executed. Further, since the torque changeover is executed after the torque matching for matching second target driving torque $T_{W2}*$ and third driving torque $T_{W3}*$ is executed, the torque selecting is smoothly executed. Furthermore, since ACC controller 20 is arranged to provide first target driving torque $T_{W1}*$ employed as a basis of third target driving torque $T_{W3}*$ at inter-vehicle distance control section 40, it is not necessary to separately prepare an inter-vehicle distance control system which is not affected by the vehicle speed. This greatly contributes to suppressing storage capacity for programs and/or calculation load of ACC controller 20 from increasing.

Figure 11:
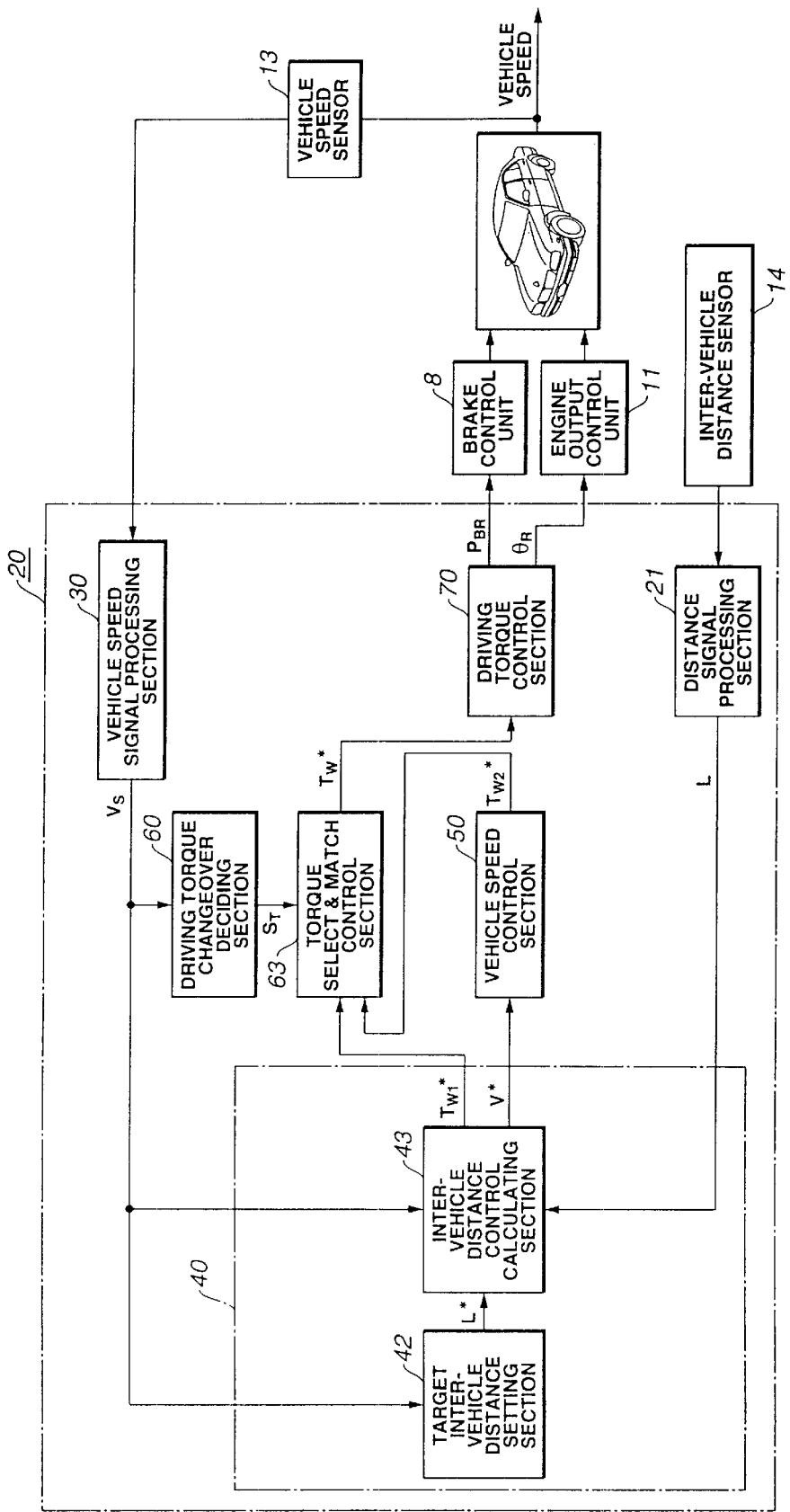
FIG. 11 is a block diagram showing a construction of the ACC controller of a second embodiment.
Figure 12:
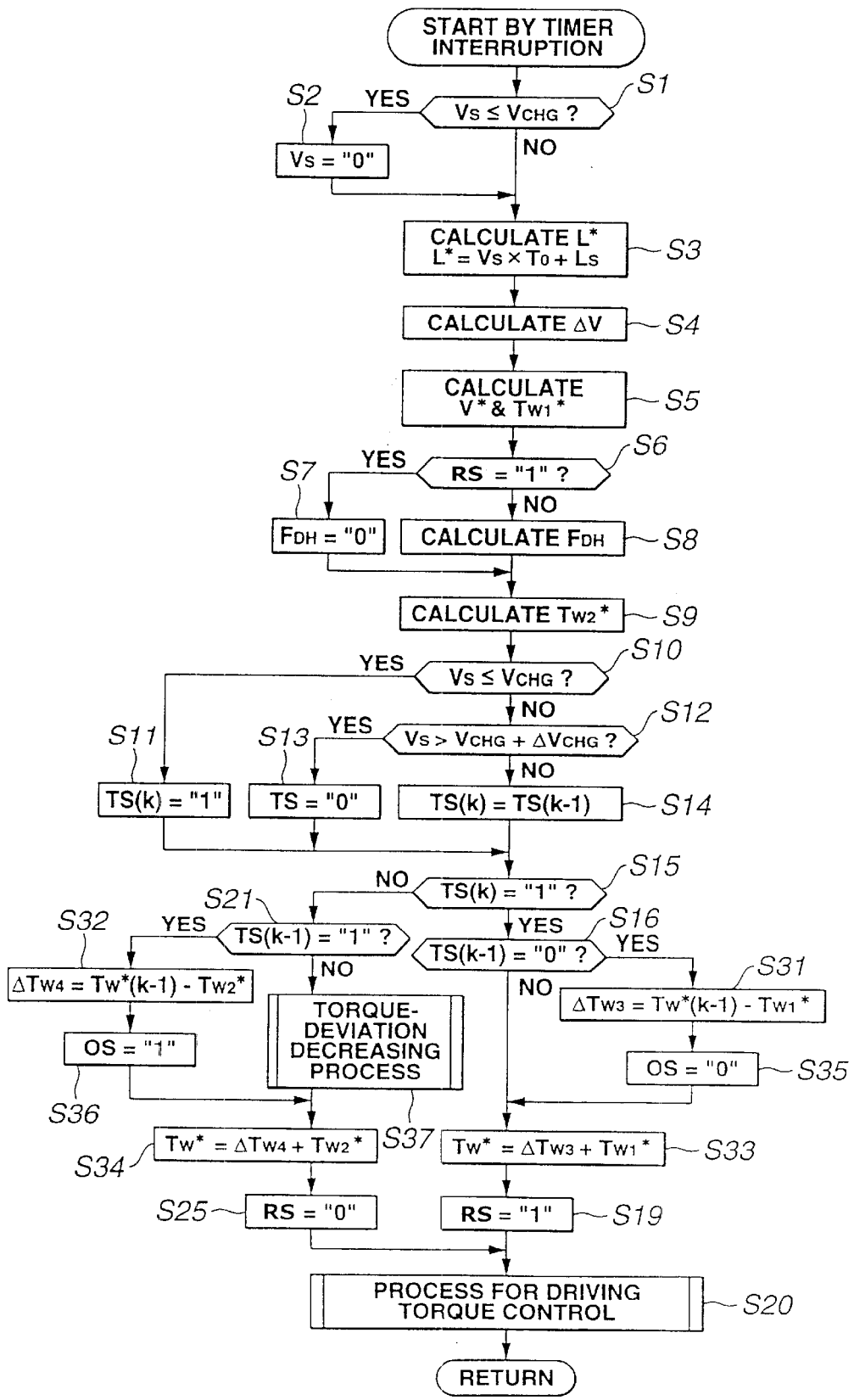
FIG. 12 is a flowchart showing the following control executed by the ACC controller of the second embodiment.

Referring to FIGS. 11 and 12, a second embodiment of the ACC system according to the present invention will be discussed. The second embodiment is characteristically arranged to omit the process for calculating third target driving torque $T_{W2}*$ and the process for setting the initial value for the calculation of the grade resistance estimate and to correct the torque deviation from the target driving torque selected at torque-changeover time.

More specifically, as shown in FIG. 11, driving torque select control section 61 shown in FIG. 2 is omitted in the second embodiment. Accordingly, first target driving torque $T_{W1}^*$ calculated at inter-vehicle distance control calculating section 43 and second target driving torque $T_{W2}^*$ calculated at vehicle speed control section 50 are inputted to a torque select and match control section 63. When torque select signal $S_T$ inputted from driving torque changeover deciding section 60 is zero ($S_T$=0), first target driving torque $T_{W1}^*$ is selected. When torque select signal $S_T$ is 1 ($S_T$=1), second target driving torque $T_{W1}^*$ is selected. Further, during the torque changeover, the torque matching between former and later target driving torques is executed.

ACC controller 20 executes the following control processing shown in FIG. 12 instead of the following control of FIG. 8 at predetermined intervals (10 msec) as a timer interruption processing.

This following control processing of the second embodiment is modified by replacing step S17 of FIG. 8 with step S31 where torque deviation $\Delta T_{W3}$ is calculated by subtracting first target driving torque $T_{W1}^*$ calculated at step S5 from previous target driving torque $T_W^*$(k-1). Similarly, step S22 of FIG. 8 is replaced with step S32 wherein torque deviation $\Delta T_{W4}$ is calculated by subtracting second target driving torque $T_{W2}^*$ calculated at step S9 from previous target driving torque $T_W^*$(k-1). Step S18 of FIG. 8 is replaced with step S33 wherein target driving torque $T_W^*$ is calculated by adding torque deviation $\Delta T_{W3}$ and first target driving torque $T_{W1}^*$, and step S23 of FIG. 8 is replaced with step S34 wherein target driving torque $T_W^*$ is calculated by adding torque deviation $\Delta T_{W4}$ and second target driving torque $T_{W2}^*$. Further, following to steps S31 and S32, step S35 for resetting a condition flag OS at 0 and step S36 for setting condition flag OS at 1 are provided, respectively. Furthermore, there is provided step S37 between steps S21 and S34 as shown in FIG. 12. At step S37, ACC controller 20 executes a torque-deviation decreasing process for gradually decreasing torque deviation $\Delta T_W$ by executing a subroutine. The other steps of the flowchart of FIG. 12 are the same as those of FIG. 8 and are designated by same reference numerals. Therefore, the explanation thereof is omitted herein.

Figure 13:
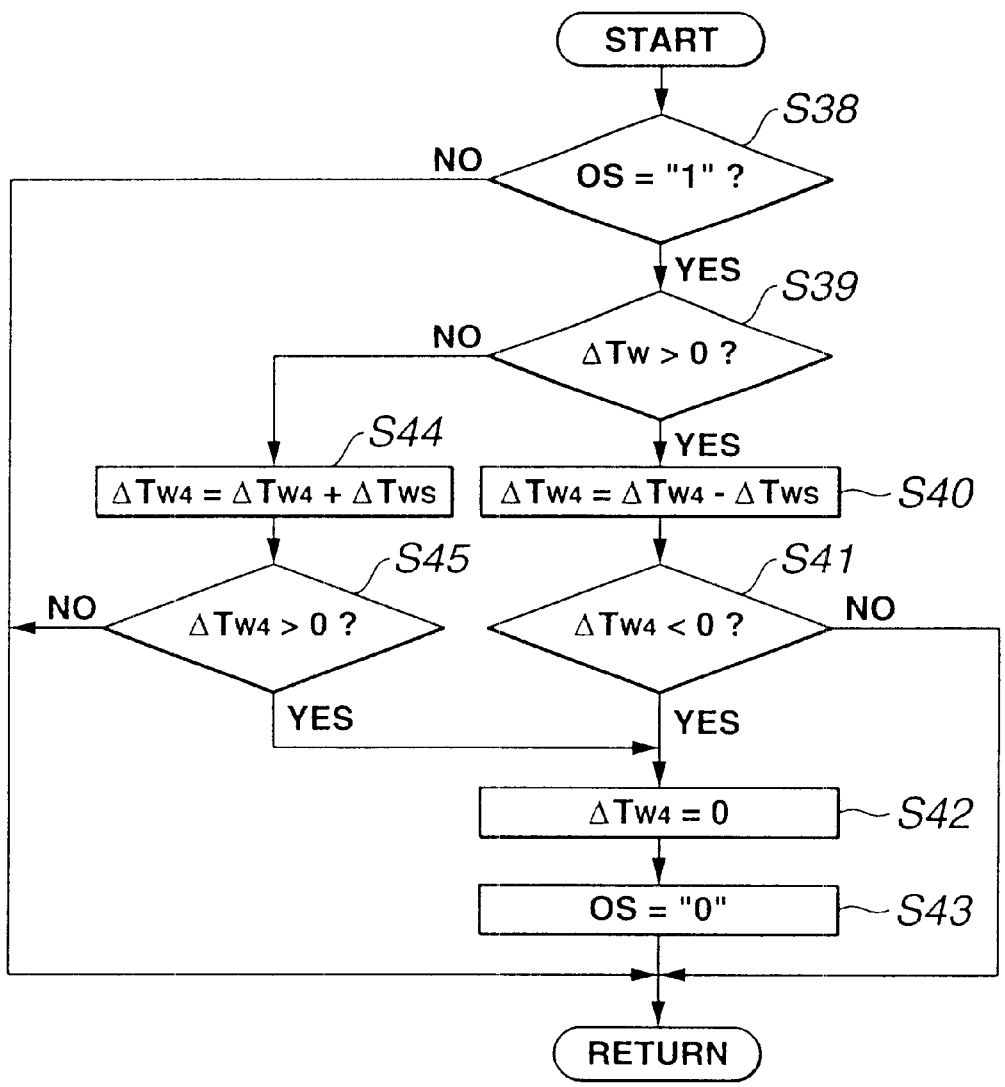
FIG. 13 is a flowchart showing a torque deviation decreasing process executed at step S37 of the flowchart of FIG. 12.

The torque-deviation decreasing process executed at step S37 is particularly shown by a flowchart of FIG. 13. First, at step S38, ACC controller 20 decides whether or not condition flag OS indicative of an offset condition of second target driving torque $T_{W2}^*$ is set at 1. When the decision at step S38 is negative (OS=0), this subroutine jumps to a return step to terminate the present subroutine. When the decision at step S38 is affirmative (OS=1), the subroutine proceeds to step S39 wherein ACC controller 20 decides whether torque deviation $\Delta T_W$ is positive or not. When the decision at step S39 is affirmative ($\Delta T_W$>0), the subroutine proceeds to step S40 wherein new torque deviation $\Delta T_{W4}$ is calculated by subtracting a predetermined value $\Delta T_{WS}$ from present torque deviation $\Delta T_{W4}$ ($\Delta T_{W4}=\Delta T_{W4}-\Delta T_{WS}$). Then, the subroutine proceeds from step S40 to step S41 wherein ACC controller 20 decides whether new torque deviation $\Delta T_{W4}$ is negative or not. When the decision at step S41 is affirmative ($\Delta T_{W4}$<0), the subroutine proceeds to step S42 wherein torque deviation $\Delta T_{W4}$ is set at 0 ($\Delta T_{W4}$=0). Thereafter, the subroutine proceeds from step S42 to step S43 wherein condition flag OS is reset at 0 (OS=0), and further proceeds to the return step to return to the routine of FIG. 12. When the decision at step S41 is negative ($\Delta T_{W4} \geqq 0$), the subroutine proceeds to the return step to terminate the present subroutine.

On the other hand, when the decision at step S39 is negative ($\Delta T_{W4} \leqq 0$), the subroutine proceeds to step S44 wherein new torque deviation $\Delta T_{W4}$ is calculated by adding predetermined value $\Delta T_{WS}$ to present torque deviation $\Delta T_{W4}$ ($\Delta T_{W4}=\Delta T_{W4}+\Delta T_{WS}$). Then, the subroutine proceeds from step S44 to step S45 wherein ACC controller 20 decides whether new torque deviation $\Delta T_{W4}$ is positive or not. When the decision at step S45 is affirmative ($\Delta T_{W4}$>0), the subroutine proceeds to step S42. When the decision at step S45 is negative ($\Delta T_{W4} \leqq 0$), the subroutine proceeds to the return step to terminate the present subroutine. After the execution of the subroutine of FIG. 13, the program routine of the FIG. 13 proceeds to step S34.

In the processing of FIGS. 12 and 13, processing at steps S10 to S14 corresponds to driving torque deciding means, processing at steps S15, S16, S19, S21, S25 and S31 to S45 corresponds to torque select and match means.

With the thus arranged second embodiment according to the present invention, as is similar to the first embodiment, when host vehicle speed $V_S$ is greater than changeover vehicle speed $V_{CHG}$ and when the host vehicle is decelerated, torque select flag TS is reset at 0. Therefore, the routine of FIG. 12 proceeds from step S15 through step S21 to step S37 wherein the torque deviation decreasing process is executed. However, when a relatively long time period elapsed from the moment when toque select flag TS is changed from 1 to 0 (that is, previous accelerating period), torque deviation $\Delta T_{W4}$ is set at 0, and condition flag OS is reset at 0. Therefore, second target driving torque $T_{W2}^*$ is put in a non-offset condition.

Accordingly, second target driving torque $T_{W2}^*$, which is calculated at step S9 upon taking account of the running resistance including road grade, air resistance and rolling resistance, takes a negative value ($T_{W2<TW1}^*$) and is selected as target driving torque $T_{W2}^*$. Therefore, the throttle opening is fully closed and the braking condition is continued through the control of the braking pressure of brake actuator 7.

Under this braking condition, when host vehicle speed $V_S$ becomes smaller than changeover vehicle speed $V_{CHG}$, that is, when the host vehicle travels at extremely low-speed, torque select flag TS(k) is set at 1 (TS(k)=1), Further, the routine of FIG. 12 proceeds through steps S15 and S16 to step S31 wherein torque deviation $\Delta T_{W3}$ is calculated by subtracting first target driving torque $T_{W1}^*$ from previous target driving torque $T_W^*$(k-1). Accordingly, torque deviation $\Delta T_{W3}$ takes a negative value, and the routine proceeds to step S35 wherein condition flag OS is set at 1 (OS=1). Further, the routine proceeds to step S33 wherein target driving torque $T_W^*$ is calculated by adding torque deviation $\Delta T_{W3}$ to first target driving torque $T_{W1}^*$. The sum of torque deviation $\Delta T_{W3}$ to first target driving torque $T_{W1}^*$ takes a value equal to previous second target driving torque $T_{W2}^*$(k-1) and is selected as target driving torque $T_W^*$ instead of second target driving torque $T_{W2}^*$. Therefore, the changeover of the target driving torque is smoothly executed without generating change of deceleration during this torque changeover, and therefore the following control for maintaining the predetermined inter-vehicle distance is continued without being affected by inaccurate extremely-low host vehicle speed $V_S$.

When host vehicle speed $V_S$ becomes greater than the sum of changeover vehicle speed $V_{CHG}$ and hysteresis width $\Delta V_{CHG}$ from the extremely low-speed traveling condition, due to the acceleration of the preceding vehicle, torque select flag TS(k) is set at 1 (TS(k)=1), and therefore the routine of FIG. 12 proceeds from step S15 through step S21 to step S32 wherein negative torque deviation $\Delta T_{W4}$ is calculated by subtracting positive second target driving torque $T_{W2}^*$ calculated at step S9 from previous target driving torque $T_W^*(k-1)$, that is, the sum of first target driving torque $T_{W1}^*$ and torque deviation $\Delta T_{W3}$. Further, the sum of second target driving torque $T_{W2}^*$ and torque deviation $\Delta T_W$ calculated at step S34 becomes smaller by torque deviation $\Delta T_W$ and therefore the sum is matched with previous target driving torque $T_W^*(k-1)$. Therefore, as is similar to the first embodiment, the torque changeover to second target driving torque $T_{W2}^*$ is smoothly executed without generating acceleration change.

Thereafter, if accelerating condition is maintained, by the processing of step S13, the routine proceeds from step S21 to step S37 wherein the torque deviation decreasing process shown in FIG. 13 is executed. Therefore, torque deviation $\Delta T_{W4}$ is brought closer to zero by each timer interruption cycle. And if torque deviation $\Delta T_{W4}$ becomes smaller than 0, torque deviation $\Delta T_{W4}$ is set at zero ($\Delta T_{W4}$=0). Accordingly, target driving torque $T_W^*$ calculated at step S34 takes a value where an offset amount of second target driving torque $T_{W2}^*$ is cancelled, and therefore the following control is accurately executed.

With the thus arranged second embodiment according to the present invention, when target driving torque $T_W^*$ is selected from one of first and second target driving torques $T_{W1}^*$ and $T_{W2}^*$ to the other, torque deviation $\Delta T_{W3}$ or $\Delta T_{W4}$ between former target driving torque $T_W^*(k-1)$ and later (new) target driving torque $T_{W1}^*$ or $T_{W2}^*$ is calculated, and the calculated deviation is added to later (new) target driving torque $T_{W1}^*$ or $T_{W2}^*$ to match the torque between the selecting former and later torques. Therefore, the torque changeover is smoothly executed without generating change of acceleration and deceleration.

Although the first and second embodiments have been shown and described such that host vehicle speed $V_S$ is set at zero, when host vehicle speed $V_S$ becomes smaller than or equal to changeover vehicle speed $V_{CHG}$ and therefore host vehicle speed $V_S$ based on the detection signal of vehicle speed sensor 13 becomes inaccurate, the invention is not limited to this and may be arranged such that target inter-vehicle distance L* is set at a proper value greater than stopping-state inter-vehicle distance $L_S$ when host vehicle speed $V_S$ becomes smaller than changeover vehicle speed $V_{CHG}$.

Further, although the first and second embodiments according to the present invention have been shown and described such that vehicle speed sensor 13 detects a rotation speed of an output side of automatic transmission 3, it will be understood that the invention is not limited to this and may be arranged such that the vehicle speed is obtained by detecting wheel speeds of front wheels 1FL and 1FR and by multiplying the average of the wheel speeds and a tire circumference. Further, an estimated vehicle speed, which possibly suppresses the influence of anti-brake lock control, may be calculated by detecting wheel speeds of four wheels 1FL, 1FR, 1RL and 1RR.

Figure 14:
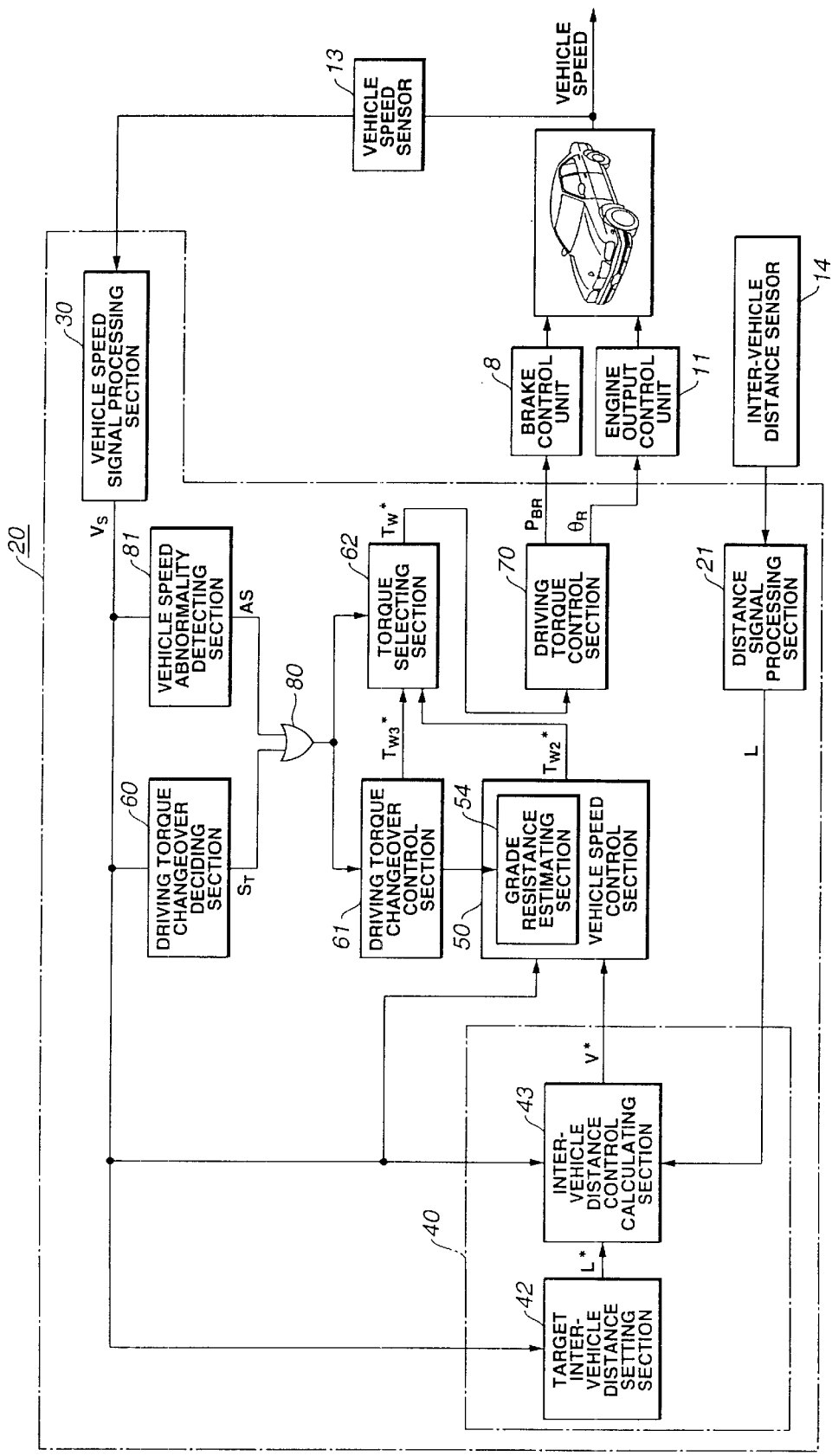
FIG. 14 is a block diagram showing a construction of the ACC controller of a third embodiment.

Referring to FIG. 14, a third embodiment of the ACC system according to the present invention will be discussed. The third embodiment is particularly arranged to further comprise a fail-safe function for adapting to abnormality of the host vehicle speed detecting system in addition to the construction of the first embodiment. More specifically, the third embodiment is arranged such that a two-input OR circuit 80 is installed between driving torque changeover deciding section 60 and driving torque changeover control section 61, as shown in FIG. 14. One of two inputs of OR circuit 80 is connected to driving torque changeover deciding section 60, and the other of two input is connected to a vehicle speed abnormality detecting section 81 which detecting the abnormality of vehicle speed sensor 13. Vehicle abnormality detecting section 81 monitors host vehicle speed $V_S$ inputted from vehicle speed processing section 30. When the detection signal indicative of host vehicle speed varies within a predetermined variation width, vehicle abnormality detecting section 81 decides that the host vehicle speed detecting system including vehicle speed sensor 13 and vehicle speed signal processing section 30 is operating normally and outputs an abnormality detection signal AS set at 0 (AS=0) to OR circuit 80. However, when the vehicle speed detection signal suddenly varies to zero over a predetermined variation width, vehicle abnormality detecting section 81 decides that the host vehicle speed detecting system is operating abnormally and outputs abnormality detection signal AS set at 1 (AS=1) to OR circuit 80.

With this third embodiment according to the present invention, when the host vehicle speed detecting system including vehicle speed sensor 13 is operating normally, abnormality detecting signal AS outputted from vehicle-speed abnormality detecting section 81 is set at 0 indicative of normality of the host vehicle speed detecting system. Accordingly, driving torque changeover control section 61 and torque selecting section 62 execute the selecting of the target driving torque by selecting one of second and third target driving torques $T_{W2}^*$ and $T_{W3}^*$ on the basis of torque select signal $T_S$ outputted from driving torque changeover deciding section 60 and by executing the torque matching.

When host vehicle speed $V_S$ inputted to vehicle speed abnormality detecting section 81 suddenly decreases from a normal value to zero due to trouble of the vehicle speed detecting system, such as breaking of wire, vehicle speed abnormality detecting section 81 decides that the vehicle speed control system is put in an abnormal state and outputs abnormality detection signal AS set at 1 (AS=1) to OR circuit 80. Therefore, driving torque select control section 61 calculates torque deviation $\Delta T_{W1}$ by executing the calculation of equation (20) under a condition where second target driving torque $T_{W2}^*$ taking account of running resistance is selected on the basis of host vehicle speed $V_S$. Further, driving torque changeover control section 61 calculates third target driving torque $T_{W3}^*$ by adding torque deviation $\Delta T_{W1}$ to first target driving torque $T_{W1}^*$. Simultaneously, torque selecting section 62 selects third target driving torque $T_{W3}^*$ as target driving torque $T_W^*$.

Even under this condition, third target driving torque $T_{W3}^*$ is smoothly matched with second target driving torque $T_{W2}^*$. Therefore, the changeover to third target driving torque $T_{W3}^*$ is smoothly executed without generating change of acceleration and deceleration.

That is, when the host vehicle speed detecting system is put in the abnormal state, by the processing at step S3 of FIG. 8 for calculating target inter-vehicle distance L*, it is decided whether or not abnormal detection signal AS is 1. When AS=0, target inter-vehicle distance L* is calculated from equation (1). When AS=1, it is decided that the vehicle speed control system is put in abnormal state, and target inter-vehicle distance L* is kept at the previous value, or is set at a relatively long value, so as to prevent the inter-vehicle distance from being set at an excessively small value.

Although the third embodiment according to the present invention has been shown and described such that vehicle speed abnormality detecting section 81 detects the abnormality of the vehicle speed control system due to breaking of wire, it will be understood that the abnormality is not limited to this and may be decided as abnormal when host vehicle speed $V_S$ is kept a value greater than an upper limit for a predetermined time due to short-circuit in the vehicle speed control system or when the change rate of the vehicle speed during deceleration is excessively large due to the short-circuit. Further, if a longitudinal acceleration sensor is installed to the vehicle equipped with the system according to the present invention, the abnormality detection may be executed by comparing the integral of longitudinal acceleration detected by the longitudinal acceleration sensor and host vehicle speed $V_S$.

While the third embodiment has been shown and described such that the fail-safe function as to the vehicle speed abnormality is added to the first embodiment, it will be understood that the present invention is not limited to this, and the fail-safe function may be added to the second embodiment.

Further, although the first to third embodiments according to the present invention have been shown and described such that inter-vehicle distance control calculating section 43 calculates relative speed $\Delta V$ by executing the band-pass filter treatment of inter-vehicle distance L, it will be understood that the present invention is not limited to this and may be arranged such that relative speed $\Delta V$ is calculated by executing a high-pass filer treatment or is directly measured by means of a Dopplar radar.

Furthermore, although the first to third embodiments according to the present invention have been shown and described such that automatic transmission 3 is installed to the output of engine 2, it will be understood that the present invention is not limited to this and may be arranged to install a continuously variable transmission to the output of engine 2.

Although the first to third embodiments have been shown and described such that disc brake 7 is employed as brake actuator 7 and brake control unit 8 controls the braking force of brake actuator 6 to properly generate braking force, it will be understood that the present invention is not limited to this and may be adapted to an electric vehicle which employs an electric motor as an actuator of a braking system and is arranged to generate regenerative braking force by controlling electrical output to the electric motor.

Furthermore, although the embodiments according to the present invention have been shown and described to be adapted to a rear-wheel drive vehicle, the present invention may be adapted to a front-wheel drive vehicle. Further, although the explanation has been made as to a case that engine 2 is employed as a rotation drive source, the present invention is not limited to this and may employ an electric motor or may be adapted to a hybrid vehicle employing an internal combustion engine and an electric motor.

The entire contents of Japanese Patent Application No. 11-226824 filed on Aug. 10, 1999 in Japan are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. An adaptive cruise control (ACC) system for a host vehicle, comprising:

a vehicle speed detector detecting a vehicle speed of the host vehicle;

a distance detector detecting an inter-vehicle distance between a preceding vehicle and the host vehicle;

a driving/braking force generator generating driving/braking force; and a controller connected to said vehicle speed detector, said distance detector and said driving/braking force generator, said controller, calculating a target inter-vehicle distance between the preceding vehicle and the host vehicle based on the detected vehicle speed, calculating a target vehicle speed and a first driving torque based on the inter-vehicle distance and the target inter-vehicle distance, calculating a second driving torque based on the host vehicle speed and the target vehicle speed, generating a torque select signal based on the host vehicle speed, selecting one of the first and second driving torques responsive to the torque select signal, determining a target driving torque based on the selected one of the first and second driving torques and the difference between the first and second driving torques, and outputting the target driving torque indicative signal to said driving/braking force generator.

2. The ACC system as claimed in claim 1, wherein said controller sets the torque select signal so as to select the first driving torque when the host vehicle speed is smaller than a predetermined value, and said controller sets the torque select signal so as to select the second driving torque when the host vehicle speed is greater than the predetermined value.

3. The ACC system as claimed in claim 1, wherein said controller sets the target driving torque at the sum of the first driving torque and a torque deviation between the first and second driving torques when the torque select signal is changed to a first driving torque selecting state, and said controller sets the target driving torque at the sum of the second driving torque and a difference between the first and second driving torques when the torque select signal is changed to a second driving torque selecting state.

4. The ACC system as claimed in claim 3, wherein said controller calculates the second driving torque based on an estimate of a running resistance of the host vehicle and a vehicle speed deviation between the target vehicle speed and the host vehicle speed, and said controller sets an initial value of the running resistance estimate at a torque deviation between the second and first target driving torques when the torque select signal is changed to a second driving torque selecting state.

5. The ACC system as claimed in claim 4, wherein said controller calculates the running resistance estimate by means of one of an integral control and a control process equivalent to the integral control, and the initial value of the running resistance estimate is set at the torque deviation.

6. The ACC controller as claimed in claim 1, wherein said controller calculates the first driving torque based on a vehicle property, a constant indicative of a vehicle control characteristic and a vehicle speed intermediate value calculated based on the target inter-vehicle distance and the inter-vehicle distance.

7. An adaptive cruise control (ACC) system for a host vehicle, comprising:

a vehicle speed detector detecting a vehicle speed of the host vehicle;

a distance detector detecting an inter-vehicle distance between a preceding vehicle and the host vehicle;

a driving/braking force generator generating driving/braking force; and a controller connected to said vehicle speed detector, said distance detector and said driving/braking force generator, said controller, calculating a target inter-vehicle distance between the preceding vehicle and the host vehicle based on the detected vehicle speed, calculating a target vehicle speed and a first driving torque based on the inter-vehicle distance and the target inter-vehicle distance, calculating a second driving torque based on the target vehicle speed and the host vehicle speed, generating a torque select signal based on the host vehicle speed, calculating a third driving torque based on the torque select signal and the first and second driving torques, matching the second and third torques when the torque select signal is turned, selecting one of the second and third driving torques as the target driving torque based on the torque select signal, and outputting a control signal corresponding to the target driving torque to said driving/braking force generator.

8. The ACC controller as claimed in claim 7, wherein said controller calculates the third driving torque by adding the first driving torque and a torque deviation between the first and second driving torques when the torque select signal is turned to a third target driving torque selecting state.

9. The ACC controller as claimed in claim 7, wherein said controller calculates the second driving torque based on an estimate of running resistance of the host vehicle and a vehicle deviation between the target vehicle speed and the host vehicle speed, and said controller sets an initial value of the running resistance estimate at a torque deviation between the second and third driving torques.

10. The ACC controller as claimed in claim 9, wherein said controller calculates the running resistance estimate by means of one of an integral control process and a control process equivalent to the integral control, and said controller sets the initial value of the running resistance estimate at the torque deviation.

11. The ACC controller as claimed in claim 7, wherein said controller generates the torque select signal indicative of selecting the third driving torque as the target driving torque when the host vehicle speed is smaller than a predetermined value, and said controller generates the torque select signal indicative of selecting the second driving torque when the host vehicle speed is greater than the predetermined value.

12. The ACC controller as claimed in claim 7, wherein said controller detects an abnormality of said vehicle speed detector, and said controller selects the third driving torque as the target driving torque when the abnormality of said vehicle speed detector is detected.

13. A method of executing an adaptive cruise control of a host vehicle, comprising:

detecting a vehicle speed of the host vehicle;

detecting an inter-vehicle distance between a preceding vehicle and the host vehicle;

calculating a target inter-vehicle distance between the preceding vehicle and the host vehicle;

calculating a target vehicle speed and a first driving torque based on the inter-vehicle distance and the target inter-vehicle distance;

calculating a second driving torque based on the target vehicle speed and the host vehicle speed;

outputting a torque select signal based on the host vehicle speed;

selecting one of the first and second driving torques responsive to the torque select signal, determining a target driving torque based on the selected one of the first and second driving torques and the difference between the first and second driving torques; and generating driving/braking force based on the target driving torque.

14. An adaptive cruise control system for a host vehicle, comprising:

vehicle speed detecting means for detecting a vehicle speed of the host vehicle;

inter-vehicle distance detecting means for detecting an inter-vehicle distance between a preceding vehicle and the host vehicle;

target inter-vehicle distance calculating means for calculating a target inter-vehicle distance between the preceding vehicle and the host vehicle;

inter-vehicle distance control means for calculating a target vehicle speed and a first driving torque based on the inter-vehicle distance and the target inter-vehicle distance;

vehicle speed control means for calculating a second driving torque based on the target vehicle speed and the host vehicle speed;

driving torque deciding means for outputting a torque select signal based on the host vehicle speed;

torque selecting and determining means for selecting one of the first and second driving torques responsive to the torque select signal and determining a target driving torque based on the selected one of the first and second driving torques and the difference between the first and second driving torques; and driving/braking force generating means for generating driving/braking force based on the selected driving torque.

* * * * *